(12) United States Patent
Kosuzu et al.

(10) Patent No.: US 7,141,187 B2
(45) Date of Patent: Nov. 28, 2006

(54) ELECTRODE MATERIAL FOR RECHARGEABLE LITHIUM BATTERY, ELECTRODE STRUCTURAL BODY COMPRISING SAID ELECTRODE MATERIAL, RECHARGEABLE LITHIUM BATTERY HAVING SAID ELECTRODE STRUCTURAL BODY, PROCESS FOR THE PRODUCTION OF SAID ELECTRODE STRUCTURAL BODY, AND PROCESS FOR THE PRODUCTION OF SAID RECHARGEABLE LITHIUM BATTERY

(75) Inventors: Takeshi Kosuzu, Shizuoka (JP); Soichiro Kawakami, Nara (JP); Masaya Asao, Kyoto (JP); Hidetoshi Tsuzuki, Kanagawa (JP); Takao Ogura, Kyoto (JP); Naoya Kobayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 10/300,305

(22) Filed: Nov. 20, 2002

(65) Prior Publication Data

US 2003/0157407 A1    Aug. 21, 2003

(30) Foreign Application Priority Data

Nov. 20, 2001  (JP) ............................. 2001-355409
Oct. 11, 2002  (JP) ............................. 2002-299677

(51) Int. Cl.
*H01B 1/04*    (2006.01)
*H01M 4/36*    (2006.01)

(52) U.S. Cl. ............................ 252/521.3; 429/218.1; 429/232

(58) Field of Classification Search ............. 252/521.3; 429/209, 217, 218.1, 232
See application file for complete search history.

(56) References Cited

U.S. PATENT DOCUMENTS

| | | | |
|---|---|---|---|
| 5,641,591 A | 6/1997 | Kawakami et al. | 429/218 |
| 5,658,689 A | 8/1997 | Kawakami et al. | 429/194 |
| 5,698,339 A | 12/1997 | Kawakami et al. | 429/212 |
| 5,702,845 A | 12/1997 | Kawakami et al. | 429/224 |
| 5,728,482 A | 3/1998 | Kawakami et al. | 429/10 |
| 5,780,181 A | 7/1998 | Idota et al. | 429/194 |
| 5,795,679 A | 8/1998 | Kawakami et al. | 429/218 |
| 5,800,939 A | 9/1998 | Mishina et al. | 429/57 |
| 5,824,434 A | 10/1998 | Kawakami et al. | 429/209 |
| 5,888,666 A | 3/1999 | Kawakami | 429/62 |

(Continued)

FOREIGN PATENT DOCUMENTS

EP    1 028 476 A1    8/2000

(Continued)

*Primary Examiner*—Mark Kopec
(74) *Attorney, Agent, or Firm*—Fitzpatrick, Cella, Harper & Scinto

(57) ABSTRACT

An electrode material for a rechargeable lithium battery, characterized in that said electrode material comprises a fine powder of a silicon-based material whose principal component is silicon element, said fine powder having an average particle size (R) in a range of 0.1 μm≦R<0.5 μm. An electrode structural body for a rechargeable lithium battery, having an electrode material layer comprising said silicon-based material fine powder. A rechargeable lithium battery whose anode comprising said electrode structural body.

33 Claims, 13 Drawing Sheets

U.S. PATENT DOCUMENTS

| | | | |
|---|---|---|---|
| 5,919,589 A | 7/1999 | Kawakami et al. | 429/231.8 |
| 5,998,063 A | 12/1999 | Kobayashi et al. | 429/218.1 |
| 6,051,340 A | 4/2000 | Kawakami et al. | 429/231.95 |
| 6,063,142 A | 5/2000 | Kawakami et al. | 29/623.5 |
| 6,165,642 A | 12/2000 | Kawakami et al. | 429/218.1 |
| 6,171,727 B1 | 1/2001 | Ogura et al. | 429/218.2 |
| 6,235,427 B1* | 5/2001 | Idota et al. | 429/218.1 |
| 6,329,096 B1 | 12/2001 | Kawakami et al. | 429/49 |
| 6,372,387 B1 | 4/2002 | Kawakami et al. | 429/303 |
| 6,377,030 B1 | 4/2002 | Asao et al. | 320/161 |
| 6,383,686 B1 | 5/2002 | Umeno et al. | 429/231.8 |
| 6,432,585 B1 | 8/2002 | Kawakami et al. | 429/233 |
| 6,475,664 B1 | 11/2002 | Kawakami et al. | 429/137 |
| 2002/0015889 A1 | 2/2002 | Yamamoto et al. | 429/231.95 |
| 2002/0037455 A1 | 3/2002 | Tani et al. | 429/223 |
| 2002/0055041 A1 | 5/2002 | Koybayashi et al. | 429/221 |
| 2002/0064710 A1 | 5/2002 | Kawakami et al. | 429/231.95 |
| 2002/0197530 A1 | 12/2002 | Tani et al. | 429/218.2 |
| 2005/0064291 A1* | 3/2005 | Sato et al. | 429/233 |
| 2005/0089755 A1* | 4/2005 | Matsubara et al. | 429/218.1 |

FOREIGN PATENT DOCUMENTS

| | | |
|---|---|---|
| EP | 1 033 767 A1 | 9/2000 |
| EP | 1 039 568 A1 | 9/2000 |
| JP | 11-283627 | 10/1999 |
| JP | 2000-36323 | 2/2000 |
| JP | 2000-215887 | 8/2000 |
| JP | 2000-311681 | 11/2000 |
| WO | 00/17949 | 3/2000 |
| WO | WO 01/52336 | 7/2001 |
| WO | WO 01/52337 A1 | 7/2001 |

* cited by examiner

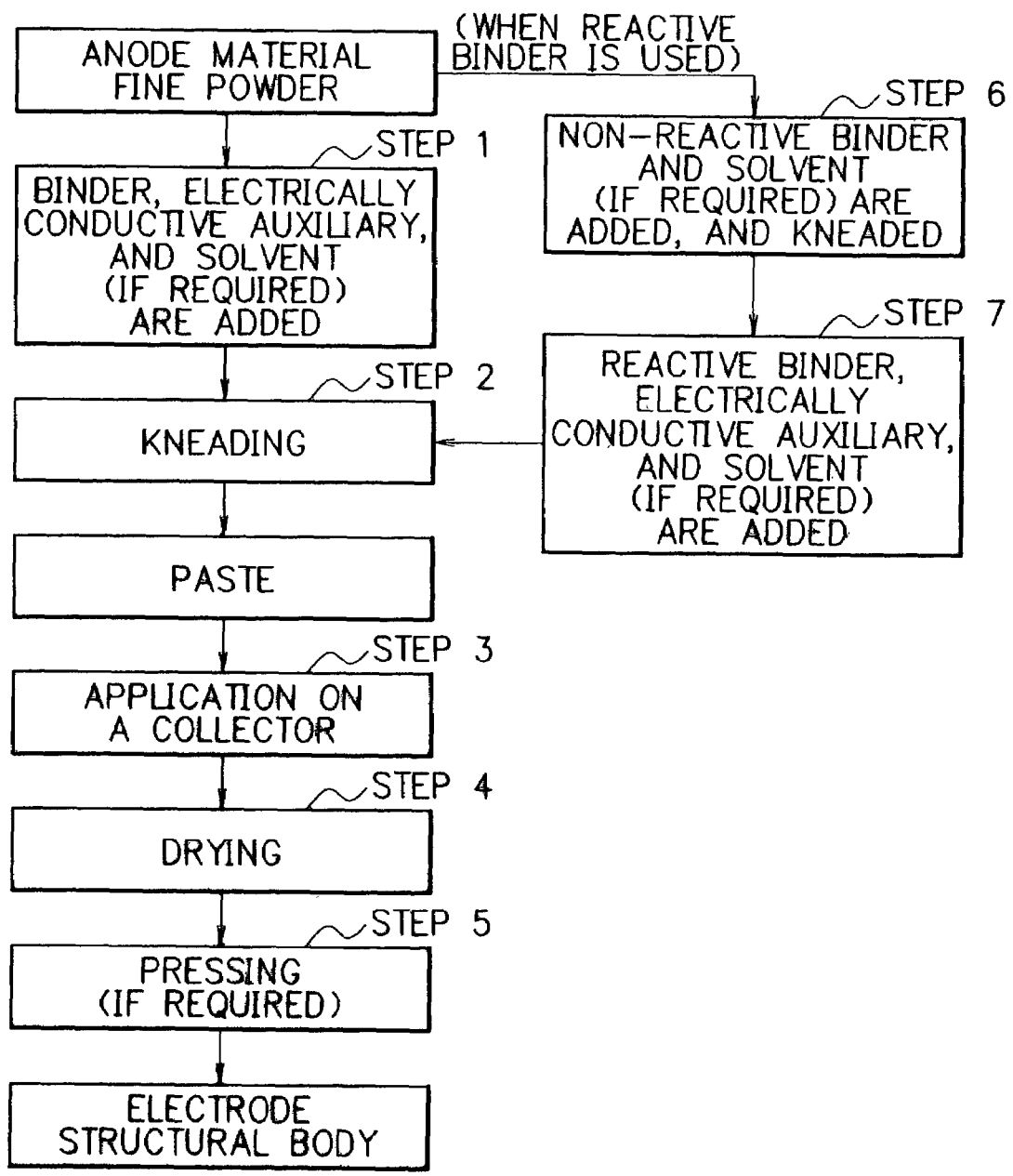

ELECTRODE MATERIAL FOR RECHARGEABLE LITHIUM BATTERY, ELECTRODE STRUCTURAL BODY COMPRISING SAID ELECTRODE MATERIAL, RECHARGEABLE LITHIUM BATTERY HAVING SAID ELECTRODE STRUCTURAL BODY, PROCESS FOR THE PRODUCTION OF SAID ELECTRODE STRUCTURAL BODY, AND PROCESS FOR THE PRODUCTION OF SAID RECHARGEABLE LITHIUM BATTERY

BACKGROUND OF THE INVENTION

1. Field of the Invention

The present invention relates to an electrode material for a rechargeable lithium battery in which oxidation-reduction reaction of lithium is used, said electrode material comprising a fine powder of a silicon-based material whose principal component is silicon and which has an average particle size in a range of more than 0.1 μm to less than 0.5 μm which means that when said average particle size is represented by R, $0.1\ \mu m \leq R < 0.5\ \mu m$, where the silicon-based material fine powder preferably contains oxygen element in a small amount such that at least particles constituting the silicon-based material fine powder are covered by a thin oxide film with respect their surfaces. The present invention also relates to an electrode structural body comprising said electrode material and a rechargeable lithium battery whose anode comprising said electrode structural body. The present invention includes a process for the production of said electrode structural body and a process for the production of said rechargeable lithium battery.

2. Prior Art

In recent years, the global warming of the earth because of the so-called greenhouse effect due to an increase in the content of $CO_2$ gas in the air has been predicted. For instance, in thermal electric power plants, thermal energy obtained by burning a fossil fuel is being converted into electric energy, and along with burning of such fossil fuel, a large amount of $CO_2$ gas is being exhausted in the air. Accordingly, in order to suppress this situation, there is a tendency of prohibiting to newly establish a thermal electric power plant. Under these circumstances, so-called load leveling practice has been proposed in order to effectively utilize electric powers generated by power generators in thermal electric power plants or the like, wherein a surplus power unused in the night is stored in rechargeable batteries installed at general houses and the power thus stored is used in the daytime when the demand for power is increased, whereby the power consumption is leveled.

Now, for electric vehicles which do not exhaust any air polluting substances such as $CO_2$, $NO_x$, hydrocarbons and the like, there is an increased demand for developing a high performance rechargeable battery with a high energy density which can be effectively used therein. Besides, there is also an increased demand for developing a miniature, lightweight, high performance rechargeable battery usable as a power source for portable instruments such as small personal computers, portable type MD players, video cameras, digital cameras and cellular phones.

As such miniature, lightweight and high performance rechargeable battery, there have proposed lithium ion batteries of the so-called rocking chair type in that a carbonous material such as graphite capable of intercalating lithium ion at intercalation sites of its six-membered network plane provided by carbon atoms in the battery reaction upon charging is used as an anode material and a lithium intercalation compound capable of deintercalating said lithium ion from the intercalation in the battery reaction upon charging is used as a cathode material. Some of these lithium ion batteries have been put to practical use.

However, for any of these lithium ion batteries whose anode comprising the carbonous material (the graphite), the theoretical amount of lithium which can be intercalated by the anode is only an amount of ⅙ per carbon atom at the most. Because of this, in such lithium ion battery, when the amount of lithium intercalated by the anode comprising the carbonous material (the graphite) is made to be greater than the theoretical amount upon charging or when charging is performed under condition of high electric current density, there will be an unavoidable problem such that lithium is deposited in a dendritic state (that is, in the form of a dendrite) on the surface of the anode. This will result in causing internal-shorts between the anode and the cathode upon repeating the charge-and-discharge cycle. Therefore, it is difficult for the lithium ion battery whose anode comprising the carbonous material (the graphite) to achieve a high capacity.

Now, rechargeable lithium batteries in which a metallic lithium is used as the anode have been proposed and they have attracted public attention in a viewpoint that they exhibit a high energy density. However, such rechargeable battery has not been put to practical use because the charge-and-discharge cycle life is extremely short. A main reason why the charge-and-discharge cycle life is extremely short has been generally considered as will be described in the following. The metallic lithium as the anode reacts with impurities such as moisture or an organic solvent contained in an electrolyte solution to form an insulating film or/and the metallic lithium as the anode has an irregular surface with portions to which electric field is converged, and these factors lead to generating a dendrite of lithium upon repeating the charge-and-discharge cycle, resulting in internal-shorts between the anode and cathode. As a result, the charge-and-discharge cycle life of the rechargeable battery is extremely shortened.

In order to eliminate the problems of the rechargeable battery in which the metallic lithium is used as the anode, specifically, in order to suppress the progress of the reaction between the metallic lithium of the anode and the moisture or the organic solvent contained in the electrolyte solution, there has been proposed a method in that a lithium alloy such as a lithium-aluminum alloy is used as the anode. However, this method is not widely applicable in practice for the following reasons. The lithium alloy is hard and is difficult to wind into a spiral form and therefore, it is difficult to produce a spiral-wound cylindrical rechargeable battery. Accordingly, it is difficult to attain a rechargeable battery having a sufficiently long charge-and-discharge cycle life. It is also difficult to attain a rechargeable battery having a sufficient energy density similar to that of a primary battery in which a metallic lithium is used as the anode.

There are various proposals in order to such problems as described in the above. Particularly, U.S. Pat. No. 5,795,679 discloses an anode for a rechargeable lithium battery, comprising a powder of an alloy comprising a metal element such as Ni or Cu and Sn or the like.

U.S. Pat. No. 6,051,340 discloses an anode for a rechargeable lithium battery, comprising a collector comprising a first metal such as Ni or Cu which is incapable of being alloyed with lithium which is generated upon charging and an electrode layer on said collector, comprising said first metal and a second metal such as Si or Sn which is capable of being alloyed with lithium which is generated upon charging.

U.S. Pat. No. 6,432,585 B1 discloses an anode for a rechargeable lithium battery, having an electrode material layer containing 35 wt. % or more of a grained host matrix material comprising Si or Sn and which has an average particle size in a range of from 0.5 to 60 µm.

Japanese Laid-open Patent Publication No. Hei.11(1999)-283627 discloses an anode for a rechargeable lithium battery, comprising an amorphous phase-bearing metallic material of Si or Sn.

Japanese Laid-open Patent Publication No.2000-311681 discloses an anode for a rechargeable lithium battery, comprising a particulate of an amorphous Sn-A (transition metal element) with a substantially non-stoichiometric composition.

International Laid-open Publication WO 00/17949 discloses an anode for a rechargeable lithium battery, comprising a particulate of an amorphous Si—A (transition metal element) with a substantially non-stoichiometric composition.

Japanese Laid-open Patent Publication No.2000-215887 discloses an anode material for a rechargeable lithium battery, comprising a particulate comprising a number of separate particles of a metal or a semimetal capable of being alloyed with lithium, said particles having a surface covered by a carbon layer, specifically, silicon particles whose surfaces are covered by a carbon layer, wherein the carbon layer is formed by a method of subjecting a carbon supply source such as benzene or the like to a chemical evaporation treatment through thermal decomposition.

By the way, as one of the compounds comprising Li and Si, there is known a $Li_{4.4}Si$ alloy compound. For this compound, when a maximum theoretical electricity storable capacity is calculated by presuming that the Li can be entirely released in the electrochemical reaction, the maximum theoretical electricity storable capacity becomes to be 4200 mAh/g. In view of this, it has been expected that if a silicon-based material could be put to use as an anode material for a rechargeable lithium battery, it will be possible to attain a rechargeable lithium battery having a high capacity. And various studies have being conducted in order to achieve an anode comprising such silicon-based material which enables to produce a rechargeable lithium battery having a high capacity.

However, any of the anodes described in the above-mentioned documents is difficult to attain an electrode performance in that lithium can be inserted or leased at a high electricity quantity which is exceeding 1000 mAh/g. Thus, there is an increased demand for providing a high capacity anode for a rechargeable lithium battery, having an electrode performance in that lithium can be inserted or leased at a high electricity quantity which is exceeding 1000 mAh/g.

SUMMARY OF THE INVENTION

The present invention has been accomplished in view of the foregoing situation in the prior art for rechargeable lithium batteries.

An object of the present invention is to provide a high capacity electrode material for a rechargeable lithium battery, said electrode material comprising a fine powder (a fine particulate) of a silicon-based material whose principal component is silicon (this fine powder will be hereinafter referred to as "silicon-based material fine powder"), said silicon-based material fine powder having an average particle size in a range of more than 0.1 µm to less than 0.5 µm, which means that when said average particle size is represented by R, 0.1 µm≦R<0.5 µm. The silicon-based material fine powder includes a silicon obtained from a silicon ingot substantially comprising silicon and a silicon alloy containing Si in an major amount of more than 50 wt. % (that is, ≧50 wt. %) and transition metal element or/and Sn respectively in a minor amount. In a preferred embodiment, said silicon alloy is a silicon alloy containing Si in an major amount of more than 50 wt. % and Sn and transition metal element in a sum amount of the Sn and the transition metal element which falls in a range of from 1 to 50 wt. %.

In a preferred embodiment, the silicon-based material fine powder contains oxygen element (O) in an amount in a range of from more than 0.5 wt. % to less than 5 wt. % (that is, 0.5 wt. %≦[O]≦5 wt. %) such that at least particles constituting the silicon-based material powder are covered by a thin oxide film with respect to their surfaces.

The electrode material provided according to the present invention has a high electricity storable capacity of more than 1000 mAh per a unit weight of the electrode material.

Another object of the present invention is to provide an electrode structural body for a rechargeable lithium battery, having an electrode material layer on a collector, said electrode material layer comprising aforesaid silicon-based material fine powder, an electrically conductive auxiliary and a binder.

A further object of the present invention is to provide a rechargeable lithium battery comprising at least an anode, a cathode and an electrolyte, characterized in that said anode comprises aforesaid electrode structural body. The electrolyte may contain a compound selected from the group consisting of metal halides and amines.

The rechargeable lithium battery provided according to the present invention has a high energy density and a high electricity storable capacity and the charge-and-discharge cycle life thereof is longer than that of a conventional rechargeable lithium battery whose anode comprising a silicon series material.

A still further object of the present invention is to provide a process for producing the above described electrode structural body and a process for producing the above described rechargeable lithium battery.

BRIEF DESCRIPTION OF THE DRAWINGS

FIG. 3 is a schematic flow diagram illustrating an example of a process for the production of an electrode structural body for a rechargeable lithium battery in the present invention.

DESCRIPTION OF THE INVENTION AND PREFERRED EMBODIMENTS

Figure 1:
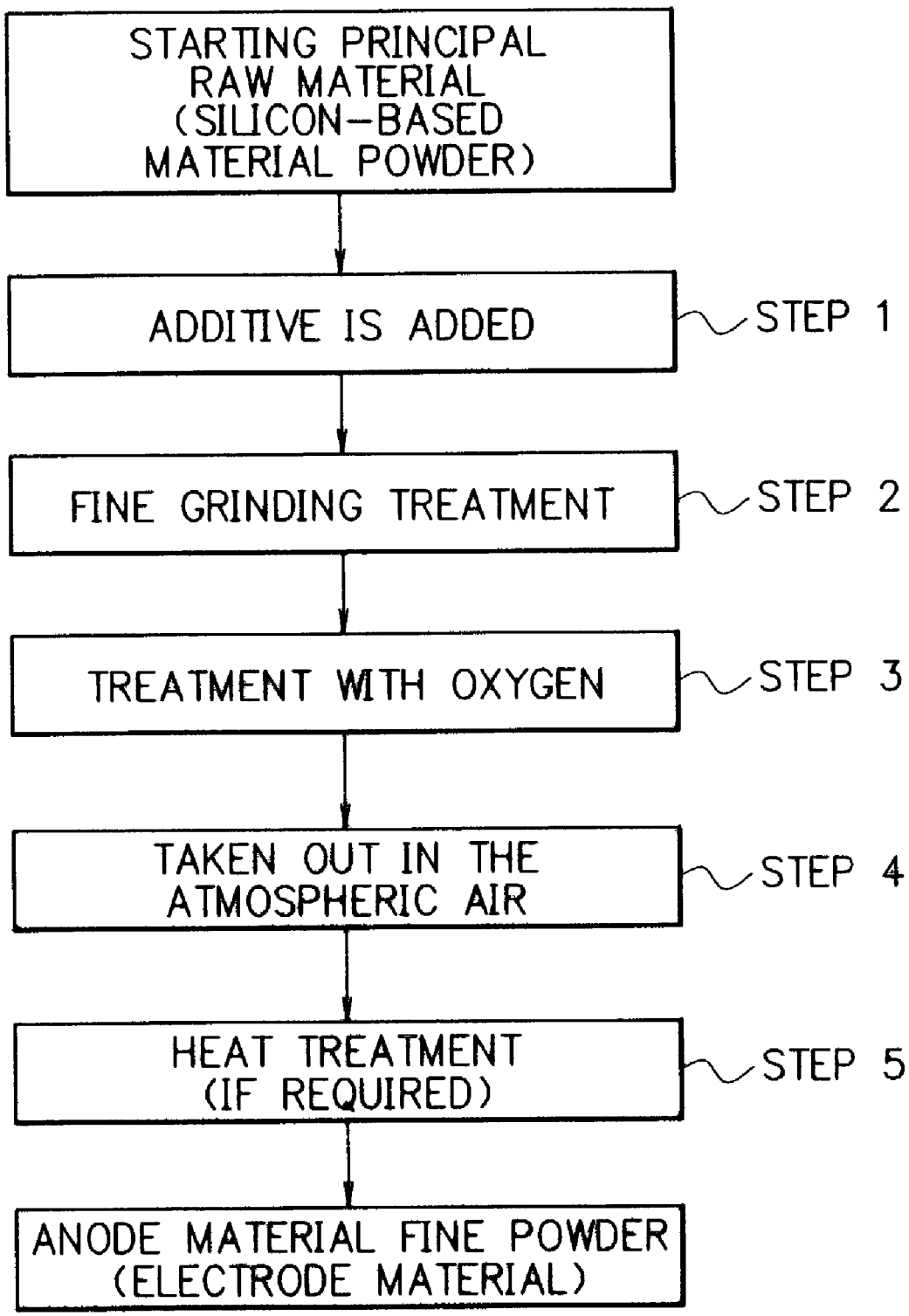
FIG. 1 is a schematic flow diagram illustrating an example of a process for the production of an electrode material for a rechargeable lithium battery in the present invention.

In order to solve the foregoing problems in the prior art for rechargeable lithium batteries having an anode comprising a silicon series material, the present inventors made extensive studies while focusing on the silicon series materials constituting their anodes.

Particularly, the present inventors conducted extensive studies through various experiments in order to find out a means which enables to electrochemically store a large quantity of lithium in a silicon particulate (powder).

First, said silicon particulate was subjected to a fine grinding treatment, where the silicon particulate was finely ground to have an average particle size of, for instance, less than 0.5 µm (that is, <0.5 µm). As a result, there was obtained a finely grained silicon particulate having a large specific surface area and whose constituent particles have a surface is in a very active state. The finely grained silicon particulate was found to be readily reacted with oxygen such that it will be burned to form an oxide. Thus, the finely grained silicon particulate was found not to able to function as a high capacity anode material for a rechargeable lithium battery. However there was obtained a finding that by controlling the oxidation reaction of the finely grained silicon particulate afforded upon the fine grinding treatment by way of controlling the oxygen content of the finely grained silicon particulate, it is possible to obtain a finely grained silicon particulate having an average particle size (R) in a range of more than 0.1 µm to less than 0.5 µm (0.1 µm≦R<0.5 µm) which functions as a high capacity anode material for a rechargeable lithium battery. And there was obtained a finding that when this finely grained silicon particulate is progressively amorphizated, it is possible to restrain a reduction in the performance due to repetition of insertion-and-release of lithium.

Separately, there was obtained a finding that by using a finely grained particulate (powder) of a silicon alloy containing Si in a major amount of more than 50 wt. % and Sn or Cu in a minor amount (obtained by way of alloying Si with Sn or Cu) and which has an average particle size (R) in a range of more than 0.1 µm to less than 0.5 µm (0.1 µm≦R<0.5 µm), it is possible to attain a high capacity anode material for a rechargeable lithium battery.

Further, for an electrode (an anode) in which aforesaid finely grained silicon particulate (powder) or aforesaid finely grained silicon alloy particulate (powder) is used, there was obtained a finding that when the electrochemical insertion-and-release of lithium is repeated several times, in the case where the silicon particulate or the silicon alloy particulate is progressively amorphizated, the peaks in the X-ray diffraction pattern are substantially disappeared.

Separately, there was obtained a finding that by adding a metal halide such as a metal iodide or an amine to an electrolyte solution as an ion conductor, it is possible to restrain a reduction in the performance of aforesaid electrode due to repetition of the insertion-and-release of lithium. It is considered such that the addition of said metal halide such as said metal iodide contributes to restrain occurrence of a phenomenon in that lithium which is deposited in the silicon-based fine particulate by the electrochemical reaction is deactivated by way of reacting with the solvent or the like of the electrolyte solution. Similarly, it is considered such that the addition of said amine provides an effect of diminishing hydrogen fluoride generated in the electrolyte solution. When the mount of the hydrogen fluoride generated in the electrolyte solution is increased, it is predicted that lithium which is deposited in the silicon-based fine particulate by the electrochemical reaction reacts with the hydrogen fluoride to generate lithium fluoride which is insulating or the hydrogen fluoride elutes part of the silicon-based particulate to cause a reduction in the lithium-storing performance of the electrode.

The present invention has been accomplished based on the above-described findings.

A first embodiment of an electrode material (capable of being electrochemically alloyed with lithium which is generated upon charging) for a rechargeable lithium battery in the present invention comprises a silicon-based material fine powder having an average particle size (R) in a range of more than 0.1 μm to less than 0.5 μm (0.1 μm≦R<0.5 μm).

In the case where the average particle size of the electrode material is less than 0.1 μm (that is, <0.1 μm), the surface area per a unit volume becomes to be undesirably large, where there is a fear that the silicon-based material fine powder as the electrode material is rapidly oxidized when it is contacted with air. Even if the occurrence of such rapid oxidation reaction could be prevented, there is a fear that the oxygen element content in the fine powder is excessively increased to reduce the initial efficiency with respect to the insertion-and-release of lithium.

Figure 9:
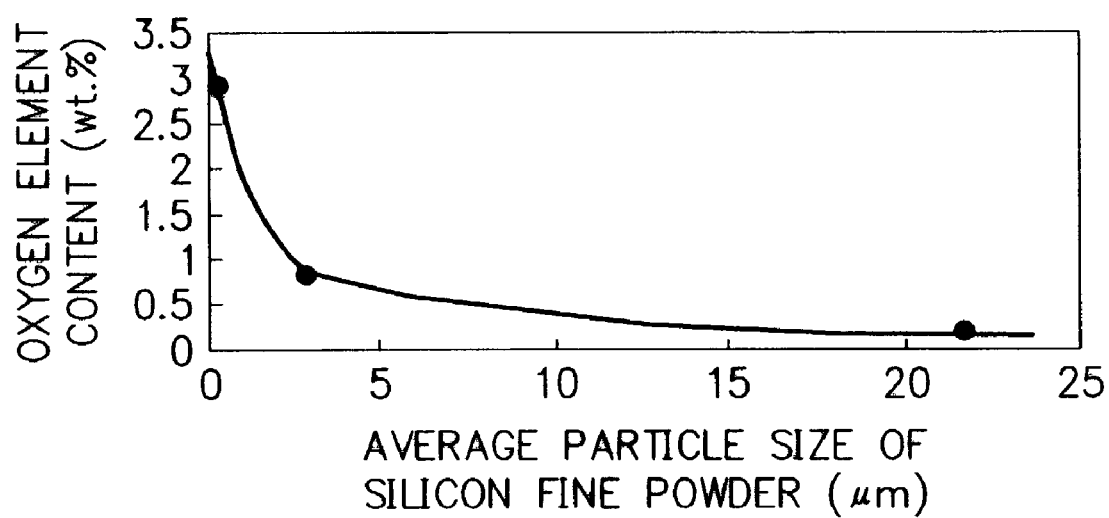
FIG. 9 shows a graph of relationships between average particle sizes and oxygen element contents with respect to silicon fine powders.

FIG. 9 shows a graph of relationships between average particle sizes and oxygen element contents with respect to silicon fine powders obtained by finely grinding a silicon particulate. As will be understood from the graph of FIG. 9, there was obtained a finding that when the average particle size becomes to be less than 0.28 μm, the oxygen element content is suddenly increased. There was also obtained a finding that the oxygen element content when the average particle size is less than 0.28 μm becomes to be 2.994 wt. % and the oxygen element content when the average particle size is less than 0.1 μm becomes to be a large value which exceeds 5 wt. %. However, the electrode material of the first embodiment in the present invention enables to prevent the surface area per a unit weight from being excessively increased and to restrain the occurrence of the sudden oxidation reaction when contacted with air and a reduction in the initial efficiency with respect to the insertion-and-release of lithium because the average particle size is more than 0.1 μm.

Separately, using a plurality of electrodes (a) formed using a silicon fine powder and a plurality of lithium metal electrodes (b), the performance of the silicon fine powder as an electrode material for a rechargeable lithium battery was evaluated in the following manner. That is, a pair of the electrode (a) and the electrode (b) are immersed in an electrolyte solution obtained by resolving a lithium salt in an organic solvent, where a cycle of electrochemically inserting lithium in the electrode (a) and electrochemically releasing said lithium from the electrode (a) is repeated several times to evaluate the initial insertion-and-release coulombic efficiency of lithium with respect to the silicon fine powder as the electrode material.

Figure 10:
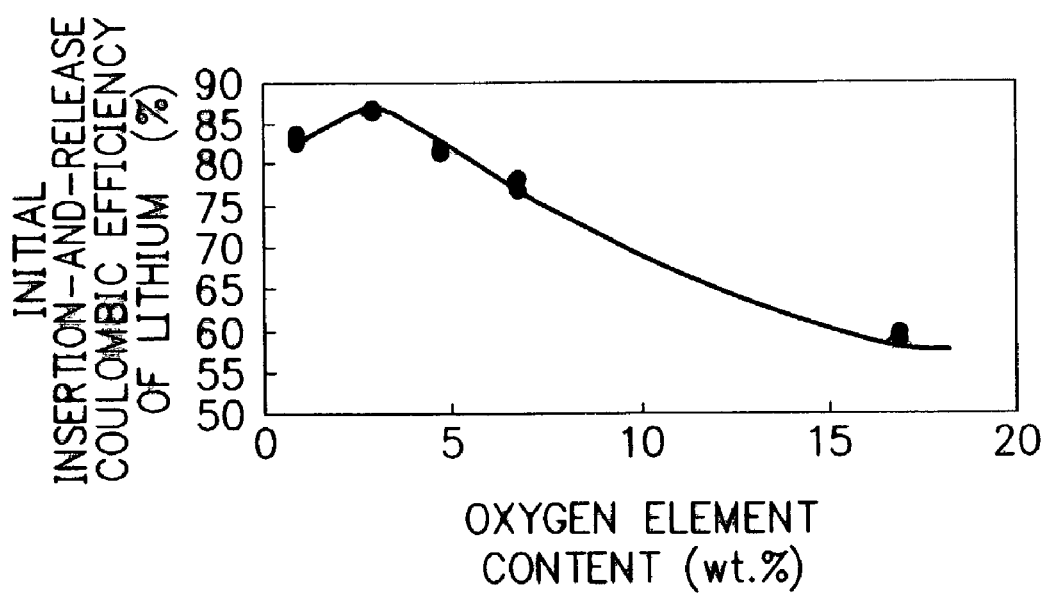
FIG. 10 shows a graph of initial insertion-and-release efficiencies of lithium with respect to electrode materials comprising a silicon fine powder as anode materials for a rechargeable lithium battery in relation to oxygen element contents per a unit weight in said electrode materials, obtained in Example 2 which will be described later.

FIG. 10 is a graph in which the evaluated results obtained in the above are graphically illustrated. Particularly FIG. 10 shows a graph illustrating the initial insertion-and-release efficiencies of lithium with respect to the electrode materials in relation to oxygen element contents per a unit weight in said electrode materials, obtained in Example 2 which will be described later. From the graph of FIG. 10, it is understood that when the oxygen element content is less than 5 wt. %, the initial insertion-and-release coulombic efficiency of lithium can be maintained at a high level.

Figure 8:
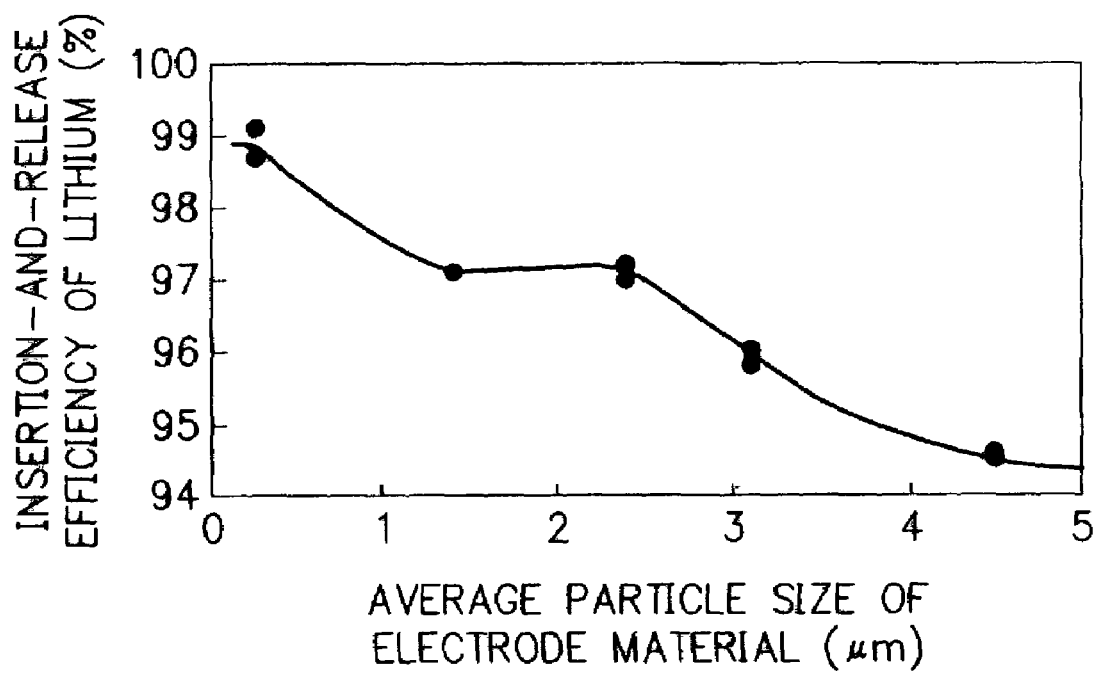
FIG. 8 shows a graph of insertion-and-release efficiencies of lithium at 10th discharge-and-charge cycle with respect to electrode materials comprising a silicon fine powder having a given average particle size as anode materials for a rechargeable lithium battery in relation to the average particle sizes of said electrode materials, obtained in Example 1 which will be described later.

FIG. 8 shows a graph of insertion-and-release efficiencies of lithium at 10th discharge-and-charge cycle with respect to electrode materials comprising a silicon fine powder having a given average particle size as anode materials for a rechargeable lithium battery in relation to the average particle sizes of said electrode materials, obtained in Example 1 which will be described later. From the graph of FIG. 8, it is understood that the insertion-and-release coulombic efficiency of lithium can be maintained at a high level by making the average particle size of the silicon fine powder to be less than 0.5 μm.

From FIGS. 8, 9 and 10, it is understood that by controlling the average particle size (R) of the silicon fine powder to fall in a range of more than 0.1 μm to less than 0.5 μm (0.1 μm≦R<0.5 μm) and controlling the oxygen element content per a unit weight to fall in a rage of more than 0.5 wt. % to less than 5 wt. % (that is, 0.5 wt. %≦[O]≦5 wt. %), not only the initial insertion-and-release coulombic efficiency of lithium but also the insertion-and-release coulombic efficiency of lithium at the 10th charge-and-discharge cycle can be maintained at a high level.

In addition, in the case where an electrode in which the above silicon fine powder is used as an anode for a rechargeable lithium battery, it was found that an electricity quantity of exceeding 1000 mAh/g per a unit weight of the silicon fine powder can be stored and released.

Similarly, in the case of a silicon-based alloy fine powder having an average particle size in a range of more than 0.1 μm to less than 0.5 μm and an oxygen element content per a unit weight which falls in a rage of more than 0.5 wt. % to less than 5 wt. %, it was found that an electricity quantity of exceeding 1000 mAh/g per a unit weight of the silicon-based alloy fine powder can be stored and discharged. The silicon-based ally can include silicon alloys containing Si as a principal component and Sn as a minor component and silicon alloys containing Si as a principal component, Sn as a minor component and a transition metal element selected from the group consisting of Cu, Ni, Co, and Ag as a minor component.

The term "average particle size" in the present invention means an average primarily particle size in a non-aggregated state. And the term "oxygen elements" in the present invention include oxygen in an atomic state, oxygen in a molecule state, and oxygen ion.

As a result of experimental studies by the present inventors, there were obtained findings as will be described in the following. That is, as the average particle size of a powdery electrode material which is electrochemically alloyed with lithium upon charging is made to be smaller, a change in the volume of the electrode material which is occurred due to the volume expansion upon alloying with lithium upon charging and also due to the volume shrinkage upon discharging becomes smaller wherein the electrode material becomes more difficult to suffer from distortion when the electrode material is expanded or shrunk in terms of the volume. However, when the average particle size of the electrode material is made to be smaller as above described, the active face is exposed, namely, the specific surface area (the reactive area) become large so as to readily react with oxygen in the air and therefore, when the electrode material is handled in the atmospheric air, it readily reacts with oxygen in the air to form oxides. When such electrode material is intended to used as the anode material of a rechargeable lithium battery, it is difficult to make the anode have a desirably large electricity storable capacity, and therefore, it is difficult to achieve a rechargeable battery having a high energy density. As a method in order to prevent the formation of such oxide, it is considered to adopt a method in that the production of a rechargeable battery is conducted under environment containing neither oxygen nor moisture. However, this method is problematic in that precise process control is necessitated and therefore, it is difficult to always produce a rechargeable lithium battery having a stable performance at a reasonable production cost.

The present inventors conducted various studies in order to solve such problems as above described. As a result, the present invention has been accomplished.

A second embodiment of an electrode material for a rechargeable lithium battery in the present invention comprises a silicon-based material fine powder having an average particle size (R) in a range of more than 0.1 µm to less than 0.5 µm (0.1 µm≦R<0.5 µm), wherein said silicon-based material fine powder contains oxygen element (O) in an amount in a range of more than 0.5 wt. % to less than 5 wt. % (0.5 wt. %≦[O]≦5 wt. %)per a unit weight of the powder.

In the case where the oxygen element content in the electrode material is less than 5 wt. %, the occurrence of rapid oxidation reaction in the production process can be desirably prevented, and the initial insertion-and-release coulombic efficiency of lithium can be made to be more than 80%.

It is preferred that the oxygen element is locally present in a region in the vicinity of the surface of the electrode material to form an oxide coat film. The oxide coat film has a function to prevent the electrode material from being oxidized. The electrode material contains the oxygen element in an amount in the above-described range and has an average particle size (R) in a range of more than 0.1 µm to less than 0.5 µm (0.1 µm≦R<0.5 µm).

The silicon-based material fine powder having an average particle size (R) in a range of more than 0.1 µm to less than 0.5 µm (0.1 µm≦R<0.5 µm) and containing oxygen element (O) in an amount in a range of more than 0.5 wt. % to less than 5 wt. % (0.5 wt. %≦[O]≦5 wt. %) per a unit weight of the powder as the electrode material has a large specific surface area and has advantages such that the amount of lithium to be electrochemically stored and released is increased and this makes it possible that an electricity quantity of exceeding 1000 mAh/g per a unit weight of the silicon fine powder is stored and released.

A first embodiment of an electrode structural body for a rechargeable lithium battery in the present invention comprises an electrode material comprising a silicon-based material fine powder having an average particle size (R)in a range of more than 0.1 µm to less than 0.5 µm (0.1 µm≦R<0.5 µm).

A second embodiment of an electrode structural body for a rechargeable lithium battery in the present invention comprises an electrode material comprising a silicon-based material fine powder having an average particle size (R)in a range of more than 0.1 µm to less than 0.5 µm (0.1 µm≦R<0.5 µm) and containing oxygen element (O) in an amount in a range of more than 0.5 wt. % to less than 5 wt. % (0.5 wt. %≦[O]≦5 wt. %) per a unit weight of the powder. The electrode material in this case contains the oxygen element in an amount in the above-described range and has an average particle size (R)in a range of more than 0.1 µm to less than 0.5 µm (0.1 µm≦R<0.5 µm).

Particularly, the electrode structural body in the present invention has an electrode material layer on a collector, characterized in that said electrode material layer comprises a specific electrode material, an electrically conductive auxiliary (C) in an amount in a range of more than 10 wt. % to less than 60 wt. % (10 wt. %≦[C]≦60 wt. %, and a binder, said electrode material comprising (a) a silicon-based material fine powder having an average particle size (R)in a range of more than 0.1 µm to less than 0.5 µm (0.1 µm≦R<0.5 µm) or (b) a silicon-based material fine powder having an average particle size (R)in a range of more than 0.1 µm to less than 0.5 µm (0.1 µm≦R<0.5 µm) and containing oxygen element (O) in an amount in a range of more than 0.5 wt. % to less than 5 wt. % (0.5 wt. %≦[O]≦5 wt. %) per a unit weight of the powder.

The amount of the silicon-based material fine powder (a) or the silicon-based material fine powder (b) to be contained in the electrode material layer is preferred to fall in a range of from 30 wt. % to 80 wt. %.

In the case where the silicon-based material fine powder is a silicon fine powder obtained by finely grinding a silicon particulate with a purity of more than 90%, when the amount of the electrically conductive auxiliary is made to be more than 30 wt. %, there is provided an advantage in that it is possible to attain an initial insertion-and-release coulombic efficiency of lithium which is more than 80%. Similarly, when the amount of the electrically conductive auxiliary is made to be less than 60 wt. %, there are provided advantages in that a change in the amount of lithium to be released between the 5th cycle and the 10th cycle is diminished and the cycle life is prolonged. In this case, the amount of the electrically conductive auxiliary is preferably in a range of more than 30 wt. % to less than 50 wt % or more preferably in a range of more than 40 wt. % to less than 50 wt. %. However, when the amount of the electrically conductive auxiliary is increased in order to improve the conductivity as in this case, the amount of the silicon-based material fine powder is decreased as much as the amount of the electrically conductive auxiliary is increased. This effects a reduction in the electricity storable capacity of the electrode. Therefore, to design a rechargeable lithium battery is designed in practice should be formed while taking the electricity quantity storable capacity, the charge-and-discharge coulombic efficiency, and the lifetime into account.

Separately, in the case where the silicon-based material fine powder is a silicon-based alloy fine powder, when the conductivity is greater than that in the case where aforesaid silicon fine powder is used, the amount of the electrically conductive auxiliary (C) is preferably in a range of more than 10 wt. % to less than 60% (10 wt. %≦[C]≦60%) or more preferably in a range of more than 20 wt. % to less than 50 wt. % (20 wt. %≦[C]≦50 wt. %).

As preferable specific examples of the electrically conductive auxiliary, there can be illustrated amorphous carbon materials such as acetylene black and ketjen black, carbonous materials such as graphite structure carbon, and metallic materials such as Ni, Cu, Ag, Ti, Pt, Al, Co, Fe, and Cr. Of these, graphite structure carbon is particularly preferable.

The electrically conductive auxiliary is preferred to be in a spherical form, a flake form, a filament form, a fabric form, a spike form, or a needle form. In a more preferred embodiment, by adopting two kinds of forms of these forms, it is possible to increase the packing density upon forming the electrode material layer so that the resulting electrode material layer has a small impedance.

The present invention also provides a rechargeable lithium battery in which oxidation-reduction reaction of lithium is used, comprising at least an anode, a cathode and an electrolyte, characterized in that said anode comprises aforesaid electrode structural body. The electrolyte may contain a compound selected from the group consisting of metal halides and amines.

The rechargeable lithium battery provided according to the present invention has a high energy density and a high electricity storable capacity and the charge-and-discharge cycle life thereof is longer than that of a conventional rechargeable lithium battery whose anode comprising a silicon series material.

In the following, description will be made of a process of producing an electrode material for a rechargeable lithium battery in the present invention and a process of producing an electrode structural body for a rechargeable lithium battery in the present invention.

[Production of an Electrode Material]

The production of an electrode material may be performed by a method in that an ingot of a silicon-based material is pulverized to obtain a course-grained silicon-based material powder and the course-grained silicon-based material powder is subjected a fine grinding treatment several times, whereby a silicon-based material fine powder having an average particle size (R) in a range of more than 0.1 µm to less than 0.5 µm (0.1 µm≦R<0.5 µm) is obtained. Besides, the production of an electrode material may be performed by a method by way of a gas atomizing method or a water atomizing method. In the gas atomizing method, a given starting silicon-based material is fused to obtain a fusion, the fusion is atomized by means of inert gas to obtain a silicon-based material powder, and a silicon-based material powder is subjected to a fine grinding treatment, whereby a silicon-based material fine powder having an average particle size (R) in a range of more than 0.1 µm to less than 0.5 µm (0.1 µm≦R<0.5 µm) is obtained.

It is preferred that the silicon-based material fine powder obtained in any case is subjected to an amorphization treatment preferably by means of a ball mill, where an amorphous phase-bearing silicon-based material fine powder is obtained. In the case where the amorphous phase-bearing silicon-based material fine powder is used as the anode material of a rechargeable lithium battery, it is possible to prolong the charge-and-discharge cycle of the rechargeable lithium battery.

In the fine grinding treatment and the amorphization treatment, it is necessary to control the oxygen content of the atmosphere where the powder is situated. That is, when the oxygen content is excessively high, an undesirably large amount of silicon oxide is formed. An electrode material obtained in this case becomes inferior in terms of the capacity to store and release lithium. Separately, in the case where the fine grinding treatment or the amorphization treatment is performed in an atmosphere containing no oxygen, the surfaces of the particles constituting the powder become active so as to readily react with oxygen, where the powder is jeopardized to burn. The burned powder is significantly inferior in terms of the performance to store lithium and therefore, it is not suitable for use as an electrode material of a rechargeable lithium battery.

In view of the above, in the production of an electrode material comprising the foregoing silicon-based material fine powder, it is preferred to adopt a method of making the electrode material to contain oxygen element (O) in an amount of more than 0.5 wt. % to less than 5 wt. % (0.5 wt. %≦[O]≦5 wt. %).

As preferable specific examples of such method, there can be illustrated a method in that the fine grinding treatment is conducted in an inert gas atmosphere added with a slight amount of oxygen, a method in that at the last stage in the fine grinding treatment, the fine powder is exposed to an inert gas atmosphere added with a slight amount of oxygen, a method in that the fine grinding treatment is conducted in alcohol or water, and a method in that the fine grinding treatment is conducted while adding a monomer or a polymer capable of restraining the progress of the oxidation.

[Production of an Electrode Structural Body]

The production of an electrode structural body may be performed, for instance, in the following manner. That is, an electrode material (comprising (a) a silicon-based material fine powder having an average particle size (R) in a range of more than 0.1 µm to less than 0.5 µm (0.1 µm≦R<0.5 µm) or (b) a silicon-based material fine powder having an average particle size (R) in a range of more than 0.1 µm to less than 0.5 µm (0.1 µm≦R<0.5 µm) and containing oxygen element (O) in an amount in a range of more than 0.5 wt. % to less than 5 wt. % (0.5 wt. %≦[O]≦5 wt. %) per a unit weight of the powder), an electrically conductive auxiliary and a binder are together mixed to obtain a mixture, the mixture is mixed with a solvent for said binder to obtain a paste, the paste is applied onto a collector to form an electrode material layer on said collector, whereby an electrode structural body is obtained.

It is preferred that the amount of the silicon-based material fine powder (a) or the silicon-based material fine powder (b) to be contained in the electrode material layer is made to fall in a range of from 30 wt. % to 80 wt. %.

It is preferred that the amount of the electrically conductive auxiliary (C) to be contained in the electrode material layer is made to fall in a range of more than 10 wt. % to less than 60 wt. % (10 wt. %≦[C]≦60 wt. %).

In the case where the silicon-based material fine powder is a silicon fine powder with a purity of more than 99%, in order to make the electrode material layer to have a desirable charge-and-discharge efficiency, the amount of the electrically conductive auxiliary (C) to be added is preferably in a range of more than 30 wt. % to less than 50 wt. % (30 wt. %≦[C]≦50 wt. %) or more preferably in a range of more than 40 wt. % to less than 50 wt. % (40 wt. %≦[C]≦50 wt. %).

In the case where the amount of the electrically conductive auxiliary to be added is excessive, the amount of the silicon-based fine powder in the electrode material layer is undesirably diminished to result in a reduction in the electricity storable capacity of the electrode material layer.

Separately, in the case where the silicon-based material fine powder is a silicon-based alloy fine powder, when the conductivity is greater than that in the case where aforesaid silicon fine powder is used, the amount of the electrically conductive auxiliary (C) to be added is preferably in a range of more than 10 wt. % to less than 60% (10 wt. %≦[C]≦60 wt. %) or more preferably in a range of more than 20 wt. % to less than 50 wt. % (20 wt. %≦[C]≦50 wt. %).

In the case where the silicon-based alloy fine powder is used as the electrode material of the electrode material layer of the electrode structural body, the conductivity of the silicon-based alloy fine powder and the conductivity between the particles constituting the silicon-based alloy fine powder are improved. Therefore, it is possible to diminish the amount of the electrically conductive auxiliary. In addition, it is possible to make the electrode material layer have a more improved charge-and-discharge efficiency. Further, it is possible to make the electrode material layer have a significantly improved electricity storable capacity of more than 2700 mAh/g per a unit weight of the silicon-based alloy fine powder as the electrode material.

A process for the production of a rechargeable lithium battery comprising at least an anode, a cathode and an electrolyte in the present invention is characterized in that said process includes a step of forming said anode, said step comprising: producing an electrode material in accordance with the foregoing procedures for the production of an electrode material and producing an electrode structural body as said anode in accordance with the foregoing procedures for the production of an electrode structural body.

The process for the production of said rechargeable lithium battery is also featured to include a step of using, as said electrolyte, an electrolyte solution comprising a lithium salt dissolved in a solvent as an ion conductor and which is added with a compound selected from the group consisting of metal halides such as aluminum iodide and amines.

The addition of said metal halide preferably said aluminum iodide to said electrolyte solution contributes mainly to prolong the charge-and-discharge cycle life of said rechargeable lithium battery. Separately the addition of said amine to said electrolyte solution contributes to diminish hydrogen fluoride generated in the electrolyte solution and to improve the discharging performance of the rechargeable lithium battery under condition of controlling the self-discharging and under low temperature condition. In addition, it serves to diminish the self-discharging.

In the following, description in more detail will be made of the present invention.

FIG. 1 is a schematic flow diagram illustrating an example of a process for the production of an electrode material for a rechargeable lithium battery in the present invention.

Following the flow diagram shown in FIG. 1, an example of the process for the production of an anode material (an electrode material) for a rechargeable lithium battery will be described.

First, there is provided a principal raw material comprising a course-grained silicon-based material powder obtained by pulverizing a silicon-based ingot or a silicon-based material powder obtained by a gas atomizing method or a water atomizing method.

In Step 1, to the principal raw material, at least one kind of a material as an additive selected from the group consisting of a carbon powder, a transition metal powder, a tin powder, water, an organic solvent, a polymer, and a polymerizable monomer is admixed.

In Step 2, the mixture obtained in Step 1 is subjected to a fine grinding treatment in an inert gas atmosphere, where the principal raw material is finely ground together with one or more of the above-mentioned additive to afford a silicon-based material fine powder having an average particle size in a range of from 0.1 to 5.0 μm. The inert gas atmosphere is preferred to comprise nitrogen gas, argon gas or helium gas.

The additive which is engaged in the fine grinding treatment together with the principal raw material (the course-grained silicon-based material powder or the silicon-based material powder) functions to prevent the particles of the principal raw material from being aggregated. The additive also functions to prevent the particles from being oxidized. And when the additive is electrically conductive, it functions to make the particles have conductivity. The additive may be added during or after the fine grinding treatment.

In Step 3, the silicon-based material fine powder obtained in Step 2 is exposed to an inert gas atmosphere containing oxygen in an amount of 0.01 to 5.0 vol. %, whereby the surfaces of the silicon-based material fine powder are covered by an oxidation preventive film comprising a thin oxide film. In the case where the oxygen content of the inert gas atmosphere is relatively low, it is preferred that the treatment is conducted while gently agitating the oxidation preventive film-forming system.

In the case where an oxidation preventive film comprising a polymer film is intended to form, it is possible that the silicon-based material fine powder is treated by adding a polymer or a polymerizable monomer after Step 2 or Step 3. After the oxidation preventive film-forming treatment, the silicon-based material fine powder is taken out in the atmospheric air (Step 4).

After this, if necessary, the resultant fine powder is subjected to a heat treatment (Step 5).

In this way, there is obtained an anode material fine powder as an electrode material.

The heat treatment in Step 5 contributes to improve the initial charge-and-discharge efficiency of a rechargeable lithium battery. For the reason for this, it is considered such that the oxide thin film formed on the surfaces of the particles of the silicon-based material fine powder is made to be dense so as to improve the oxidation preventive function of the oxide thin film, and the dangling bonds of silicon which are generated upon the fine grinding treatment are diminished.

In the case where the fine grinding treatment in Step 2 is conducted in a solvent such as alcohol or water, a thin oxide surface coat film is gently formed and this oxide surface coat film functions as an oxidation preventive film. Therefore, it is not necessary to precisely control the oxygen content in the atmosphere of the fine grinding treatment as in the case where the fine grinding treatment is performed in a dry atmosphere.

Therefore, it is always necessary to perform the treatment of Step 3. Separately, it is possible that the silicon-based fine powder is subjected to an amorphization treatment between Step 4 and Step 5. This amorphization treatment makes it possible to produce a more improved anode material fine powder having a amorphous phase-bearing crystal structure which makes it possible to produce a rechargeable lithium battery having a more prolonged charge-and-discharge cycle life.

Figure 2A:
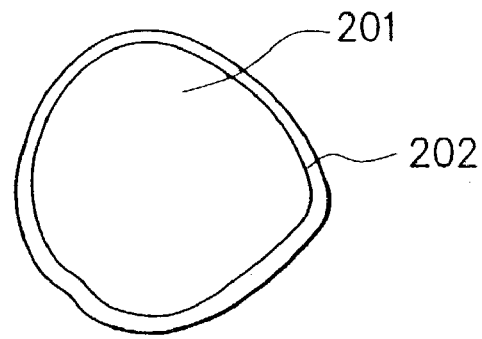
FIGS. 2(a) to 2(c) are schematic views respectively illustrating a cross-sectional structure of an example of a primary particle constituting an electrode material for a rechargeable lithium battery in the present invention.
Figure 2B:
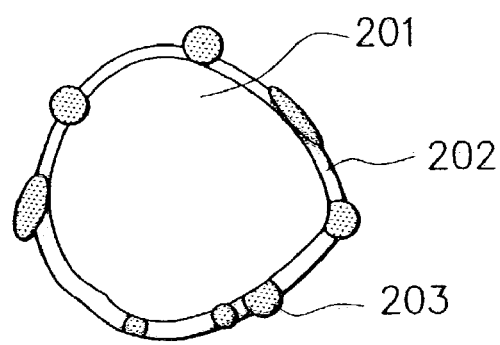
Figure 2C:
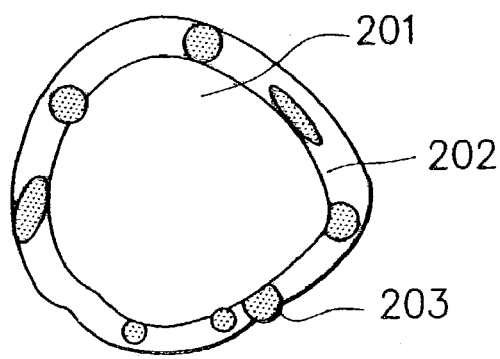

FIGS. 2(a) to 2(c) are schematic views respectively illustrating a cross-sectional structure of a primary particle constituting an anode material fine powder produced in accordance with the production process shown in FIG. 1. Particularly, FIG. 2(a) shows a cross-sectional structure of a silicon-based material particle 202 whose surface is covered by an oxidation preventive film 202. FIG. 2(b) shows a cross-sectional structure of a silicon-based material particle 202 having additives 203 at the surface thereof and whose surface is covered by an oxidation preventive film 202 such that part of the additives are exposed to the outside. FIG. 2(c) shows a cross-sectional structure of a silicon-based material particle 202 having additives 203 at the surface thereof and whose surface is covered by an oxidation preventive film 202 such that the additives are buried in the oxidation preventive film.

The oxidation preventive film 202 in any case comprises an oxide or a polymer. The additive 203 may comprise a carbon powder of a graphite or the like or a metal powder.

FIG. 3 is a schematic flow diagram illustrating an example of a process for the production of an electrode structural body for a rechargeable lithium battery.

Following the flow diagram shown in FIG. 3, an example of the process for the production of an electrode structural body for a rechargeable lithium battery will be described.

First, there is an anode material fine powder (an electrode material) produced in accordance with the production process shown in FIG. 1. In Step 1, the anode material fine powder is mixed with a binder, an electrically conductive auxiliary, and if necessary, a solvent to obtain a mixture. The mixture obtained in Step 1 is kneaded (Step 2) to obtain a paste.

In the case where as the binder, for example, a binder which is reactive with the anode material fine powder and a binder which is difficult to react with the anode material fine powder are used, the anode material fine powder is first mixed with the latter non-reactive binder (Step 6), followed by being mixed with the former reactive binder, the electrically conductive auxiliary, and if necessary, the solvent, to obtain a mixture (Step 7), and the mixture is kneaded (Step 2) to obtain a paste. It is possible that all the electrically conductive auxiliary or part of electrically conductive auxiliary is added in Step 6.

For instance, in the case where an alkaline binder is used and the anode material fine powder comprises a silicon fine powder, because the silicon fine powder is liable to react with said alkaline binder, it is preferred that the production of an electrode structural body is performed from Step 6 through Step 7.

The paste is applied onto a collector (Step 3), and the paste applied on the collector is dried (Step 4) to form an anode material layer on the collector. If necessary, the thickness of the anode material layer is adjusted by means of a roll press or the like (Step 5). Thus, there is obtained an electrode structural body.

Description will be made of the principal raw material used for producing an electrode material (an anode material) for a rechargeable lithium battery.

As previously described, the principal raw material may be a course-grained silicon-based material powder obtained by pulverizing a silicon-based ingot or a silicon-based material powder obtained by a gas atomizing method or a water atomizing method.

Such silicon-based material powder can include a silicon powder and powders of silicon-based alloys containing Si as a major component in an amount of more than 50 wt. % and containing Sn or/and a transition metal element respectively as a minor component in a sum amount of the Sn and the transition metal element which falls in a range of 1 to 50 wt. %. The transition metal element may comprise at least one kind of a transition metal element selected from the group consisting of Cr, Mn, Fe, Co, Ni, Cu, Mo, Tc, Ru, Rh, Pd, Ag, Ir, Pt, Au, Ti, V, W, Y, Zr, Nb, Hf, and Ta. Of these, Co, Ni, Cu and Ag are particularly preferable.

As preferable specific examples of such silicon-based alloy, there can be illustrated a Si—Ni alloy, a Si—Co alloy, a Si—Cu alloy, a Si—Ag alloy, a Si—Sn—Ni alloy, a Si—Sn—Co alloy, a Si—Sn—Cu alloy, and a Si—Sn—Ag alloy, respectively containing Si as a major component in an amount of more than 50 wt. %.

The powder of such silicon-based alloy may be prepared, for example, by a method (i) in that a prescribed amount of a course-grained silicon powder obtained by pulverizing a silicon ingot, a prescribed amount of a course-grained tin powder obtained by pulverizing a tin ingot or/and a prescribed amount of a course-grained transition metal powder obtained by pulverizing a transition metal ingot were mixed to obtain a mixture, the mixture is fused to obtain an alloy ingot, said alloy ingot is pulverized to obtain a course-grained alloy powder and said course-grained alloy is subjected to a grinding treatment several times to obtained a silicon-based alloy powder, a method (ii) in that said mixture obtained in the method (i) comprising said course-gained silicon powder said course-grained tin powder or/and said course-grained transition metal powder is fused to obtain a fusion and the fusion is subjected to an atomization treatment using inert gas to obtain a silicon-based alloy powder, or a method (iii) by way of a mechanical alloying method in that said course-gained silicon powder, said course-grained tin powder or/and said course-grained transition metal powder obtained in the method (i) are subjected to alloying while being mixed to obtain a silicon-based alloy powder.

In the case where the principal raw material is an alloy powder of a Si—Sn-M (transition metal element) alloy, the Si—Sn-M alloy is preferred to have composition weight ratios of the three elements such that the weight ratio of Si is in a range of from 50 to 90 wt. % which is the largest and the ratio of Sn/Sn+M(transition metal element)+Si is in a range of from 1 to 40 wt. %, to be more specific, the weight ratio of Sn is in a range of from 9 to 49 wt. % and the weight ratio of M is in a range of from 1 to 15 wt. %, wherein it is preferred that the content of Sn is greater than that of M. It is preferred that the alloy composition is made to be such that the charge-and-discharge capacity per 1 g of the alloy becomes to be more than 2000 mAh/g.

In the case where a silicon powder is used as the principal raw material, the silicon powder may contain an impurity such as Ca, Al or Fe in a slight amount. The higher the purity of the silicon powder is, the better. However, in a viewpoint to provide an electrode material (an anode material) for a rechargeable lithium battery at a reasonable cost, the purity of the silicon powder may be preferably less than 99.99%, more preferably less than 99.9%, most preferably about 99.6%. In the case where the silicon powder is not used in a state of an alloy at the ultimate, the component of the silicon powder is preferred to have an intrinsic semiconductor property or a p-type semiconductor property.

Description will be made of the additive used for producing an electrode material (an anode material) for a rechargeable lithium battery (see, Step 1 in FIG. 1).

The additive has an aggregation preventive effect, a conductivity-adding effect, or an oxidation preventive effect. It is preferred that a carbon powder is used for the aggregation prevention purpose, a graphite powder or a metal powder is used for the conductivity-adding purpose, and a carbon powder, a metal powder, a polymer or a polymerizable monomer is used for the oxidation prevention purpose. The addition of a polymer or a polymerizable monomer effects to improve the adhesion of the silicon-based material powder with the binder upon the production of an electrode structural body.

In any case, an aimed effect can be achieved by partially or entirely coating the surface of the anode material fine powder by the additive.

As the additive used upon the fine grinding treatment, a carbon powder is preferred, and a graphite powder is more preferred for the reasons that the graphite powder is relatively hard and poor in the malleability and ductility and therefore, the graphite powder is difficult to be lumped and is difficult to be adhered on the internal wall face of a grinding vessel used in the fine grinding treatment. In addition, the graphite powder has advantages such that because the graphite powder is chemically stable and is difficult to be oxidized and is difficult to be alloyed, it is possible to more effectively prevent the particles of the anode material fine powder from being oxidized by covering their surfaces by a coat of the graphite powder in the fine grinding treatment, where the graphite surface coat is high in terms of the conductivity and it allows reversible insertion and release of lithium. An electrode structural body prepared using the anode material fine powder coated with the graphite powder has pronounced advantages such that the contact resistance between the particles is diminished so that the resistance of the electrode structural body is lower and a rechargeable lithium battery whose anode comprising the electrode structural body has a large charge-and-discharge capacity.

The amount of the carbon powder (the graphite powder) as the additive to be added is preferably in a range of from 1 to 30 wt. % or more preferably in a range of from 2 to 15 wt. % respectively versus of the weight amount of the silicon-based material powder as the principal raw material to be finely ground.

When the amount of the carbon powder (the graphite powder) to be added is excessive to exceed the above range, there is a fear that the charge-and-discharge capacity per a unit weight of the electrode material will be decreased so that it is difficult to attain a rechargeable lithium battery having a high energy density.

As the additive to be added upon the fine grinding treatment, it is possible to use a transition metal powder or/and a tin powder instead of the carbon powder (the graphite powder) or together with the carbon powder (the graphite powder). When the fine grinding treatment is conducted while adding the transition metal powder or the tin powder, the surfaces of the particles of the anode material fine powder afforded in the fine grinding treatment are covered by the transition metal powder or the tin powder. In this case, alloying is liable to occur between the particles of the anode material fine powder and the covered transition metal powder or tin powder. Thus, this makes the anode material fine powder have high conductivity.

An electrode structural body prepared using the anode material fine powder coated with the transition metal powder or the tin powder has pronounced advantages such that the contact resistance between the particles is diminished so that the electric resistance of the electrode structural body is lower and a rechargeable lithium battery whose anode comprising the electrode structural body has a large charge-and-discharge capacity.

The transition metal power is preferred to comprise a powder of a transition metal selected from the group consisting of Ag, Co, Ni, Cu, W, Mo, Ti and Cr. A powder of a transition metal selected from the group consisting of Ag, Co and Cu is more preferred. And a powder of Ag and a powder of Co are most preferred because Ag and Co are pure and have high conductivity and oxides of these metals exhibit higher conductivity than that of oxides of other metal elements.

The amount of the tin powder or the transition metal powder as the additive to be added is preferably in a range of from 1 to 50 wt. % or more preferably in a range of from 5 to 30 wt. %. When the amount of the tin powder or the transition metal powder to be added is excessive to exceed the above range, there is a fear that the charge-and-discharge capacity per a unit weight of the electrode material will be decreased so that it is difficult to attain a rechargeable lithium battery having a high energy density.

The fine grinding treatment (see, Step 2 in FIG. 1) may be conducted by a dry grinding method or a wet grinding method. In the wet grinding method, the grinding treatment is performed in a solvent or by adding a solvent.

As the solvent used in the wet grinding method, it is possible to use water or an organic solvent such as alcohol or hexane. The amount of the solvent to be added is preferably in a range of from 1 to 20 wt. % or more preferably in a range of from 5 to 15 wt. %, respectively versus the total weight amount of the materials engaged in the grinding treatment. The alcohol can include methyl alcohol, ethyl alcohol, 1-propyl alcohol, 2-propyl alcohol, isopropyl alcohol, 1-butyl alcohol, and 2-butyl alcohol.

In the fine grinding treatment of the silicon-based material powder as the principal raw material, it is preferred to adopt the wet grinding method because the wet grinding method has various advantages such that an excellent fine grinding treatment can be conducted, even when the principal raw material to be finely ground contains a material whose fusing point is low such as Sn or the like, it can be effectively ground and a thin surface coat oxide film which functions as an oxidation preventive film is liable to be readily formed, although it is necessitated to remove the solvent.

Separately, when the fine grinding treatment is conducted while adding a polymer or a polymerizable monomer in the system, there is afforded an anode material fine powder whose particles are covered by a polymer coat with respect to their surfaces, where it is possible to restrain excessive formation of oxide.

In the case where an electrode structural body is prepared by using an electrode material comprising said anode material fine powder together and a binder, the adhesion between the electrode material and the binder is improved.

As the above polymerizable monomer, it is possible to use a monomer capable of being polymerized by heat. In the case where the polymerizable monomer is added, it is possible to add a polymerization initiator together with the polymerizable monomer.

The amount of the polymer or the polymerizable mononer as the coating material to be added is preferably in a range of from 1 to 10 wt. % or more preferably in a range of from 1 to 5 wt. %, respectively versus the total weight amount of the materials engaged in the grinding treatment. When the addition amount of the polymer or the polymerizable monomer is excessive to exceed the above range, there is a fear that the charge-and-discharge capacity per a unit weight of the electrode material will be decreased so that it is difficult to attain a rechargeable lithium battery having a high energy density.

As the polymer to be added, it is preferred to use a polymer which is insoluble in the electrolyte solution used in a rechargeable lithium battery. Such polymer can include water-soluble polymers and fluororesins. Preferable specific examples of the water-soluble polymer are polyvinyl alcohol, water-soluble ethylene-vinyl alcohol copolymer, polyvinyl butyral, polyethylene glycol, carboxymethylcellulose, and hydroxyethylcellulose. Preferable specific examples of the fluororesin are polyvinylidene fluoride, tetrafluoroethylene polymer, and vinylidene fluoride-hexafluoropropylene copolymer.

As the polymerizable monomer to be added, it is preferred to use a vinyl series monomer. Preferable specific examples of such vinyl series monomer are 1-decene, 1-octene, 1-hexadecene, 1,7-octadiene, and ethylundecylenate.

Any of the above-mentioned additives is preferred to be admixed with the principal raw material (the silicon-based material powder) prior to subjecting to the fine grinding treatment. It is possible that any of the additives is added during the fine grinding treatment. Separately, the polymer or the polymerizable monomer may be added after the fine grinding treatment.

The fine grinding treatment is conducted by using an adequate grinding apparatus having a high grindability. As such grinding apparatus, there can be mentioned, for example, a media agitating mill, a roller mill, a vibration mill, a jet mill, a planetary ball mill, and a high enrgy planetary ball mill.

The fine grinding treatment using any of these grinding apparatus is preferred to be conducted in an inert gas atmosphere preferably comprising nitrogen gas, argon gas, or helium gas.

By the fine grinding treatment, there is obtained an anode material fine powder (an electrode material) has an average particle size in a range of more than 0.1 to less than 0.5 μm which makes it possible to attain a rechargeable lithium battery having a large electricity storable capacity (a large charge-and-discharge capacity) and a prolonged charge-and-discharge cycle life. Particularly, when an electrode material layer formed of said anode material fine powder whose average particle size is quite small as above described is used as the anode of a rechargeable lithium battery, the electrode material layer has significant advantages such that the electrode material layer is quite small in terms of a volume change due to the volume expansion when lithium is inserted in the electrode material layer upon charging and due to the volume shrinkage when said lithium is released from the electrode material layer upon discharging and thus, the electrode material layer is hardly distorted upon the volume expansion or the volume shrinkage, and stable charge-and-discharge cycle can be repeated over a long period of time, which means that the rechargeable lithium battery has a prolonged charge-and-discharge cycle life.

In order for the rechargeable lithium to be able to perform charging at a high rate and to have a high charge-and-discharge efficiency and a prolong charge-and-discharge cycle, the anode material fine powder is desired to have a specific surface area preferably in a range of from 1 to 10 m$^2$/g or more preferably in a range of from 4 to 8 m$^2$/g.

In order to more improve the charge-and-discharge cycle life of the rechargeable lithium battery, it is preferred that the anode material fine powder has an amorphous phase-bearing crystal structure.

As previously described in the explanation of the production of an electrode material with reference to FIG. 1, by conducting the amorphization treatment between Step 4 and Step 5 (see, FIG. 1), there can be obtained an amorphous phase-bearing anode material fine powder having an average particle size in a range of more than 0.1 to less than 0.5 μm. An electrode material layer formed using this amorphous phase-bearing anode material fine powder is significantly advantageous in that the magnitude of the volume expansion when lithium is inserted upon charging is more diminished.

A rechargeable lithium battery whose anode comprising said electrode material layer has significant advantages such that the magnitude of the volume expansion of the anode when lithium is inserted upon charging and the magnitude of the volume shrinkage of the anode when said lithium is released upon discharging are slight, the performance of the anode is more difficult to be deteriorated even when charge-and-discharge cycle is repeated over a long period of time, thus the rechargeable lithium battery has a more improved charge-and-discharge cycle life. For the reason for this, it is considered such that amorphous phase has many lithium insertion sites and the structural freedom thereof is high and this contributes to diminish the magnitude of the volume expansion when lithium is inserted.

Whether or not the anode material fine powder contains amorphous phase may be confirmed by the following analytical method.

In an X-ray diffraction chart of a given specimen in which a peak intensity against a diffraction angle by X-ray diffraction analysis is appeared, in the case where the specimen is crystalline, a sharp peak is appeared. However, in the case where the specimen contains amorphous phase, a broad peak with a widened half width is appeared, and in the case where the specimen is completely amorphous, no X-ray diffraction peak is appeared.

The anode material fine powder is desired to be such that the half width of a main peak in an X-ray diffraction chart with a diffraction intensity against 2 θ is preferably more than 0.1° or more preferably more than 0.2°.

Separately, it is preferred that the anode material fine powder (the silicon-based material fine powder) is of a crystallite size, which is calculated based on data obtained in the X-ray diffraction analysis before neither charging nor discharging is operated for the electrode material layer comprising the anode material fine powder, controlled preferably in a range of less than 50 nm or more preferably in a range of less than 30 nm. By using the anode material fine powder of such minute crystallite size, the electrochemical reaction upon charging and discharging can be smoothly conducted, and the charge capacity can be greatly improved. Further, occurrence of distortion which will be occurred upon the insertion-and-release of lithium can be suppressed to a minimum level, and the charge-and-discharge cycle life can be greatly prolonged.

The amorphous phase-bearing anode material fine powder (the amorphous phase-bearing silicon-based material fine powder) which constitutes the anode of the rechargeable lithium battery is amorphized such that substantially no peak is appeared in the X-ray diffraction analysis when charge-and-discharge is repeated several times. It is considered that the amorphization of the anode material fine powder is more progressed so as to be structurally stable in the insetion-and-release and because of this, the charge-and-discharge cycle life is more prolonged.

Here, the above crystallite size can be determined from the half width and diffraction angle of a peak of a X-ray diffraction curve obtained using a radiation source comprising CuK α-rays and in accordance with the following Scherrer's equation.

$$Lc = 0.94\lambda/(\beta \cos \theta) \qquad \text{[Scherrer's equation]}$$

Lc: crystallite size
λ: wavelength of X-ray beam
β: half width (radian) of the peak
θ: Bragg angle of the diffraction line

[Oxidation Preventive Coat Film]

As previously described with reference to FIG. 1, the silicon-based material fine powder obtained in the fine grinding treatment (see, Step 2 of FIG. 1) is subjected to a surface coating treatment of forming an oxidation preventive surface coat thin film comprising a thin oxide film or a thin polymer film in order to more stabilize the silicon-based fine powder by preventing the silicon-based fine powder from being oxidized.

As previously described, the formation of the surface coat thin oxide film may be conducted by a method in that the silicon-based fine powder is exposed to an inert gas atmosphere containing oxygen in a small amount to oxidize the surface of the silicon-based fine powder into a thin oxide surface coat film. As the inert gas, nitrogen gas, argon gas, and helium gas are preferred.

The oxygen content in the inert gas atmosphere is preferably in a range of from 0.01 to 5.0 vol. % or more preferably in a range of from 0.05 to 2.0 vol. %. When the oxygen content in the inert gas atmosphere is less than 0.01 vol. %, there are disadvantages such that it takes a long period of time in order to form the oxide surface coat film, the oxide coat film formed is liable to become uneven in terms of the thickness such that it does not function as the surface protective film, and when the silicon-based material fine powder whose surface is covered such uneven oxide coat film is taken out in the atmospheric air, the silicon-based material fine powder is rapidly oxidized. When the oxygen content in the inert gas atmosphere is beyond 5.0 vol. %, the oxidation is undesirably progressed, where the silicon-based material fine powder is oxidized such that the excessive surface region is converted into a thick oxide surface coat film which is liable to react with lithium upon charging such that said reacted lithium is difficult to release upon discharging.

The thickness of the oxide surface coat film formed is somewhat different depending on the oxygen content in the inert gas atmosphere, the oxidation treatment time, the oxidation treatment temperature, or the average particle size or the specific surface area of the silicon-based material fine powder. However, in general, it is preferably in a range of from 0.8 to 100 nm or more preferably in a range of from 1 to 30 nm.

The thickness of the oxide surface coat film formed may be determined based on a result obtained by the analysis of the oxygen content and a result obtained in the observation by a transmission electron microscope.

When an anode material fine powder whose surface is covered by an excessively thick oxide surface coat film is used in the anode of a rechargeable lithium battery, the electricity storable capacity and the charge-and-discharge efficiency are lowered and the charge-and-discharge cycle life is shortened. For the reason for this, it is considered such that the oxide surface coat film reacts with lithium upon charging and the reacted lithium is difficult to release upon discharging.

In the case where the oxide surface coat film is excessively thin, problems entail such that the anode material fine powder (the silicon-based material fine powder) is progressively oxidized to alter during the time when it is stored, the anode material fine powder reacts with impurities contaminated upon the preparation of a paste in the process of forming an electrode structural body where the conductivity of the anode material fine powder itself is lowered or gas such as hydrogen gas or the like is generated to cause gas bubble in the paste, and the adhesion between the electrode material layer comprising the anode material fine powder and the corrector to cause an increase in the electrode resistance, and when the anode material fine powder is used in the anode of a rechargeable lithium battery, the electricity storable capacity and the charge-and-discharge efficiency of the anode are lowered and the charge-and-discharge cycle life of the battery is shortened.

[Heat Treatment (see, Step 5 in FIG. 1)]

As previously described, if necessary, the anode material fine powder whose surface is covered by an oxidation preventive thin film comprising a thin oxide film or a thin polymer film which is taken out in the atmospheric air in Step 4 of FIG. 1 may be subjected to a heat treatment in order to make the oxidation preventive thin surface coat film to be more dense and more strong so that the oxidation preventive thin surface coat film exhibits an ensured oxidation preventive function. In this heat treatment, heat-decomposable impurities contained in the anode material fine powder can be removed. Further, by the heat treatment, it will be possible diminish dangling bonds generated in the anode material fine powder (the silicon-based fine powder) by the fine grinding treatment or the amorphization treatment.

Thus, the heat treatment effects an improvement of the storage stability of the anode material fine powder and an improvement in the restraint of the chemical reaction upon the preparation of the paste. It also effects an increase in the charge-and-discharge capacity and an improvement in the charge-and-discharge efficiency.

The atmosphere in which the heat treatment is conducted may be a vacuumed atmosphere or a gas atmosphere. In the case where the oxidation preventive thin surface coat film comprises an organic polymer, the heat treatment is preferred to conduct in an inert gas atmosphere.

In any case, the heat treatment is necessary to be conducted at a temperature which is lower than the fusing point of the anode material fine powder (the silicon-based material fine powder).

In the case where the heat treatment is conducted in the air, the heat treatment is necessary to be conducted at a temperature where the reaction with the oxygen of the air is not progressed.

In the case where the anode material fine powder is a silicon fine powder, when the heat treatment is conducted in the air, the heat treatment temperature is preferably in a range of from 80 to 450° C. or more preferably in a range of from 100 to 350° C. Similarly, in the case where the heat treatment is conducted in an inert gas atmosphere, the heat treatment temperature is preferably in a range of from 80 to 900° C., more preferably in a range of from 80 to 600° C., most preferably in a range of from 100 to 400° C.

In the case where the electrode material comprises the silicon-based material fine powder added with Sn, the heat treatment temperature is preferably in a range of from 80 to 230° C. or more preferably in a range of from 100 to 200° C. Even in the case where Sn is added, when the addition amount thereof is small or it has been alloyed, the heat treatment may be conducted at a temperature which exceeds 230° C.

When the heat treatment temperature is excessively high, there is a fear in that the anode material fine powder reacts with the atmosphere gas and it is oxidized or nitrated. In the case where such anode material fine powder is used in the anode of a rechargeable lithium battery, the rechargeable lithium battery is problematic in that the anode is inferior in terms of the electricity storable capacity and the charge-and-discharge efficiency and the charge-and-discharge cycle life of the battery is undesirably short. Separately, when the heat treatment temperature is higher than the neighboring temperature of the fusing point of the anode material fine powder, sintering and fusion are occurred to make the anode material fine powder to be in a non-finely grained state.

[Polymer Coating Treatment]

By mixing an anode material fine powder (a silicon-based material fine powder) afforded by the fine grinding treatment with a polymer difficult to react with the components of the anode material fine powder or a solution of said polymer, it is possible to cover the surface of the anode material fine powder by a thin polymer film such that the anode material fine powder is prevented from being oxidized. This effects to restrain the chemical reaction upon the preparation of a paste (see, FIG. 3), which results in an increase in the electricity storable capacity of an electrode material layer formed using said anode material fine powder and an improvement in the charge-and-discharge efficiency of said layer. The amount of the polymer to be added is preferably in a range of from 1 to 10 wt. % or more preferably in a range of from 1 to 5 wt. % versus the weight amount of the silicon-based material fine powder.

The addition of the polymer in an excessive amount which exceeds the above range effects a reduction in the electricity storable capacity of the electrode material layer. This makes it difficult to produce a rechargeable lithium battery having a high energy density.

As the polymer used to coat the fine powder surface, it is possible to use an organic polymer which is water-soluble or water-insoluble. However, it is more preferred to use a water-soluble organic polymer.

Preferable specific examples of such water-soluble organic polymer are polyvinyl alcohol, water-soluble ethylene-vinyl alcohol polymer (whose ethylene component is small), polyvinyl butyral, polyvinyl acetal, polyvinyl methyl ether, polyvinyl ethyl ether, polyvinyl isobutyl ether, carboxymethyl cellulose, hydroxyethyl cellulose, hydroxypropyl cellulose, hydroxymethylethyl cellulose, and polyethylene glycol. In the case where the silicon-based material fine powder is a silicon fine powder, because the silicon fine powder is dissolved in an alkaline aqueous solution, it is preferred to use an aqueous solution of an adequate water-soluble polymer and which has a pH value of less than 7.0. As the water-soluble polymer used in this case, polyvinyl alcohol, water-soluble ethylene-vinyl alcohol polymer (whose ethylene component is small), polyvinyl butyral, polyvinyl acetal, polyvinyl methyl ether, polyvinyl ethyl ether, polyvinyl isobutyl ether, polyethylene glycol and hydroxyethyl cellulose are preferred.

Preferable specific examples of such water-insoluble organic polymer are polyolefins such as polyethylene and polypropylene; fluorine-containing polymers such as polyvinylidene fluoride, tetrafluoroethylene polymer and vinylidene fluoride-hexafluoropropylene copolymer; ethylene-vinyl alcohol copolymer; and polyacrylonitrile.

[Monomer Treatment]

By mixing an anode material fine powder (a silicon-based material fine powder) afforded by the fine grinding treatment with a solution of a polymerizable monomer, it is possible to cover the surface of the anode material fine powder by a thin coat film such that the anode material fine powder is prevented from being oxidized. It is considered that the monomer is reacted with dangling bonds of the atoms of the fine powder surface or is polymerized to form a thin surface coat film. The surface coat film thus formed at the fine powder surface effects to restrain the chemical reaction upon the preparation of a paste (see, FIG. 3), which results in an increase in the electricity storable capacity of an electrode material layer formed using said anode material fine powder and an improvement in the charge-and-discharge efficiency of said layer. The amount of the polymerizable monomer to be added is preferably in a range of from 1 to 10 wt. % or more preferably in a range of from 1 to 5 wt. % versus the weight amount of the silicon-based material fine powder.

As the polymerizable monomer used to coat the fine powder surface, it is preferred to use a vinyl series monomer. As specific examples of such vinyl series monomer, there can be illustrated, for example, 1-decene, 1-octene, 1-hexadecene, 1,7-octadiene, and ethylundecylenate.

It is possible to add the polymerizable monomer as it is. It is also possible to add a solution obtained by dissolving the polymerizable monomer in a solvent. The solvent can include hexane, toluene, pentane, tetrahydrofuran, and chlorine-series solvents. The concentration of the monomer solution is preferred to fall in range of from 2 to 100 wt. %.

Upon the addition of either the polymerizable monomer or the monomer solution, it is possible add a polymerization initiator.

The temperature of the heat treatment in order to form a surface coat film on the surface of the fine powder by using aforesaid polymerizable monomer is preferably in a range of from 70 to 150° C. or more preferably in a range of from 80 to 120° C. The heat treatment is preferred to be conducted in an inert gas atmosphere.

When the heat treatment temperature is excessively high to go beyond the prescribed range, the monomer is vaporized or decomposed to make it difficult to perform sufficient coating for the fine powder surface. On the other hand, when the heat treatment temperature is excessively low, the reaction does not smoothly progress, where it takes a long period of time to perform sufficient coating for the fine powder surface.

The thickness of the surface coat film formed from the polymerizable monomer is preferably in a range of from 0.2 to 30 nm or more preferably in a range of from 0.3 to 10 nm.

In the case where such anode material fine powder that has an excessively thick surface coat film formed from the polymerizable monomer is used in the anode of a rechargeable lithium battery, the rechargeable lithium battery is problematic in that the anode is inferior in terms of the electricity storable capacity and the charge-and-discharge efficiency and the charge-and-discharge cycle life of the battery is undesirably short. In the case where the surface coat film formed from the polymerizable monomer is excessively thin, the surface coat film does not function as the oxidation preventive surface coat film. This entails problems as will be described in the following. That is, the anode material fine powder is altered during the time when it stored or the anode material fine powder chemically reacts with impurities contaminated upon the preparation of the paste in the production of an electrode structural body (see, FIG. 3) to alter. This brings about problems such that the adhesion between the electrode material layer comprising the anode material fine powder and the corrector to cause an increase in the electrode resistance, and when the anode material fine powder is used in the anode of a rechargeable lithium battery, the electricity storable capacity and the charge-and-discharge efficiency of the anode are lowered and the charge-and-discharge cycle life of the battery is shortened.

[Electrode Structural Body]

Figure 4A:
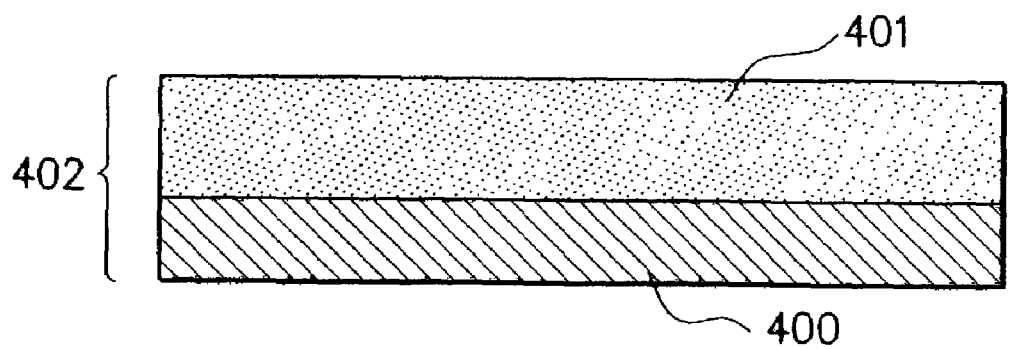
FIGS. 4(a) and 4(b) are schematic cross-sectional views respectively illustrating an example of an electrode structural body for a rechargeable lithium battery in the present invention.
Figure 4B:
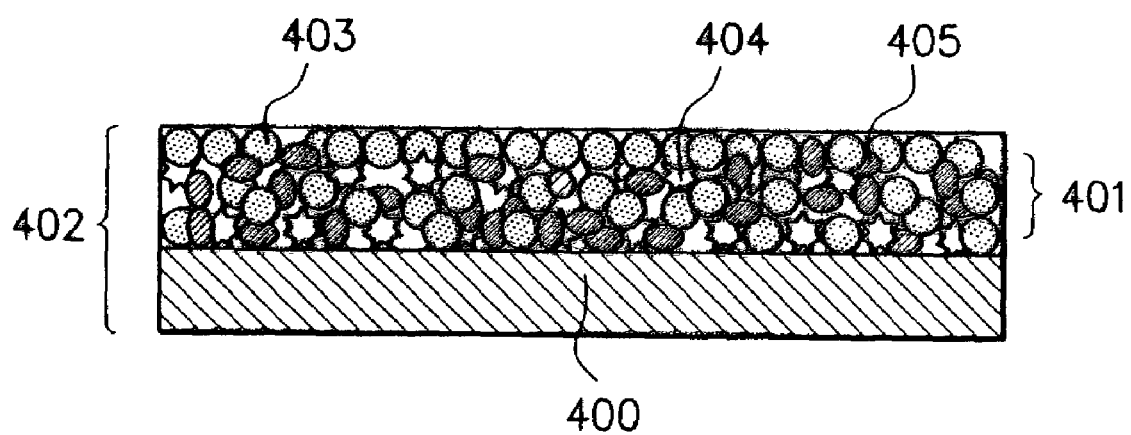

FIGS. 4(a) and 4(b) are schematic cross-sectional views respectively illustrating a cross section structure of an electrode structural body 402 which has an electrode material layer 401 comprising an anode material fine powder (a silicon-based material fine powder) for a rechargeable lithium battery, prepared in accordance with the foregoing method for the production of the anode material fine powder. Particularly, FIG. 4(a) shows an electrode structural body 102 having an electrode material layer 401 comprising the anode material fine powder which is provided on a collector 400. FIG. 4(b) shows an electrode structural body 402 having an electrode material layer 401 provided on a collector 400, wherein the electrode material layer 401 comprises the anode material fine powder 403, an electrically conductive auxiliary 404, and a binder 405. In each of FIGS. 4(a) and 4(b), the electrode material layer 401 is provided only on one side of the collector 400. However, it is possible for the electrode material layer to be provided on each of the opposite faces of the collector 400 depending upon the configuration of a rechargeable lithium battery.

In the following, description will be made of examples of a process for producing the electrode structural body 402.

(1) The electrode structural body 402 shown in FIG. 4(a) may be produced, for example, by directly forming an electrode material layer 401 comprising a given anode material fine powder (a given silicon-based material powder) of the present invention on a collector 400 by a manner of press-forming said anode material fine powder on said collector.

(2) The electrode structural body 402 shown in FIG. 4(b) may be formed, for example, by mixing a given anode material fine powder (a given silicon-based material fine powder)403 of the present invention, a given electrically conductive auxiliary 404, and a given binder 405 to obtain a mixture and adding a given solvent to said mixture while adjusting the viscosity to obtain a paste, applying said paste on a collector 400, and drying the paste applied on the collector 400 to form an electrode material layer 401 on the collector. In this case, the thickness or density of the electrode material layer 401 formed on the collector 400 may be adjusted by means of roll press or the like.

[Collector 400]

The collector 400 serves to supply an electric current such that said electric current can be efficiently consumed for the electrode reaction upon charging and it also serves to collect an electric current generated upon discharging. Particularly in the case where the electrode structural body 402 is used as the anode of a rechargeable lithium battery, as the constituent of the collector 400, it is desired to use a material having a high electric conductivity and which is inactive to the battery reaction. Such material can include metallic materials which are incapable of being alloyed with lithium in the electrochemical reaction. Preferable specific examples of such metallic material are metals such as Cu, Ni, Fe, Ti, and Pt, and alloys of these metals such as stainless steel.

The collector 400 is desired to be in the form of a plate shape. The plate shape in this case may be of a thickness in a practical range. The plate shape can include a so-called "foil" configuration with a thickness of about 100 μm or less. Besides, it is possible to adopt a mesh member, a sponge member, a fibrous member, a punching metal member, and a expanded metal member, respectively in the form of a plate shape.

[Electrode Material Layer]

The electrode material layer 401 is a layer comprising the foregoing anode material fine powder of the present invention which is capable of being alloyed with lithium in the electrochemical reaction. The electrode material layer 401 may be a layer constituted by the anode material fine powder (the silicon-based material fine powder) of the present invention only or a layer constituted by a composite comprising the anode material fine powder (the silicon-based material fine powder) of the present invention, an electrically conductive auxiliary and a binder comprising an organic polymer.

The above composite layer may be formed by mixing the anode material fine powder (the silicon-based material fine powder) of the present invention with a given electrically conductive auxiliary and a given binder to obtain a mixture, applying said mixture on a collector, and subjecting the mixture applied to a press forming treatment. In order to make the mixture to be readily applied, it is preferred that the mixture is added with a solvent into a paste-like material prior to the application. The application of the mixture may be conducted by means of, for instance, a coater coating method or a screen printing method. Alternatively, the electrode material layer may be formed by arranging a mixture comprising the anode material fine powder (the silicon-based material fine powder) of the present invention as the main constituent material, the electrically conductive auxiliary and the binder without adding the solvent or a mixture comprising the main constituent material and the electrically conductive auxiliary without mixing the binder on the collector and subjecting to a press forming treatment.

In any case, the rate occupied by the anode material fine powder (the silicon-based material fine powder) of the present invention in the electrode material layer is preferred to fall in a range of from 30 to 80 wt. % versus the total weight amount of all the materials to constitute the electrode material layer.

As the electrically conductive auxiliary, any of the materials previously illustrated as the electrically conductive auxiliary can be optionally used.

The term "the content amount of the electrically conductive auxiliary" in the description does not include the amount of the additive (for example, graphite or the like) added upon the grinding treatment of the silicon-based material powder as the principal raw material but it indicates the content amount of the electrically conductive auxiliary added upon the formation of the electrode material layer.

By the way, the volume expansion of the anode material fine powder of the present invention upon charging is relatively large in comparison with that of a conventional carbon material such as graphite. Because of this, when the density of the active material layer (the electrode material layer) formed by using the anode material fine powder as a main starting material is excessively high, peeling is liable occur at the interface between the collector and the active material layer due to the volume expansion upon charging, and when the density is excessively low, there is a tendency in that the contact resistance between the particles is increased to cause a reduction in the current-collecting performance. Therefore, it is desired that the density of the electrode material layer is controlled to fall preferably in a range of from 0.9 to 2.5 $g/cm^2$ or more preferably in a range of from 1.0 to 1.8 $g/cm^2$.

As the binder, it is possible to use an organic polymer which is water-soluble or water-insoluble. However, it is more preferred to use a water-soluble organic polymer as the binder.

Preferable specific examples of such water-soluble organic polymer are polyvinyl alcohol, water-soluble ethylene-vinyl alcohol polymer (whose ethylene component is small), polyvinyl butyral, polyvinyl acetal, polyvinyl methyl ether, polyvinyl ethyl ether, polyvinyl isobutyl ether, carboxymethyl cellulose, hydroxyethyl cellulose, hydroxypropyl cellulose, hydroxymethylethyl cellulose, and polyethylene glycol. In the case where the anode material fine powder (the silicon-based material fine powder) comprises a silicon fine powder, because the silicon fine powder is dissolved in an alkaline aqueous solution, it is preferred to use an aqueous solution of an adequate water-soluble polymer and which has a pH value of less than 7.0. As the water-soluble polymer used in this case, polyvinyl alcohol, water-soluble ethylene-vinyl alcohol polymer (whose ethylene component is small), polyvinyl butyral, polyvinyl acetal, polyvinyl methyl ether, polyvinyl ethyl ether, polyvinyl isobutyl ether, polyethylene glycol and hydroxyethyl cellulose are preferred.

Preferable specific examples of such water-insoluble organic polymer are polyolefins such as polyethylene and polypropylene; fluorine-containing polymers such as polyvinylidene fluoride, tetrafluoroethylene polymer and vinylidene fluoride-hexafluoropropylene copolymer; polyethylene-polyvinyl alcohol copolymer; and stylene-butadiene rubber.

As the water-soluble polymer used as the binder, it is preferred to together use either polyvinyl alcohol or ethylene-vinyl alcohol polymer and cellulose-series polymer. As the cellulose-series polymer in this case, carboxymethyl cellulose is preferred. Particularly in the case where a silicon fine powder or a silicon-based alloy fine power (whose silicon content is quite high) of the present invention is used as the anode material fine powder (the silicon-based material fine powder), the preparation of a paste is preferred to be conducted by a method in that the anode material fine powder (the silicon fine powder or the silicon-based alloy fine power) and said polyvinyl alcohol or said ethylene-vinyl alcohol polymer are mixed while adding water and kneaded to cover the surface of the anode material fine powder by the polyvinyl alcohol or the ethylene-vinyl alcohol polymer, the resultant is mixed with said carboxymethyl cellulose, followed by being kneaded. Upon the preparation of the paste, when the silicon fine powder or the silicon-based alloy fine power (whose silicon content is quite high) is fist mixed with an aqueous solution of the carboxymethyl cellulose, followed by adding the polyvinyl alcohol or the ethylene-vinyl alcohol polymer or when the silicon fine powder or the silicon-based alloy fine power (whose silicon content is quite high), an aqueous solution of the carboxymethyl cellulose and an aqueous solution of the polyvinyl alcohol or the ethylene-vinyl alcohol polymer are together mixed at a time and kneaded, a problem is occurred in that the silicon fine powder or the silicon-based alloy fine power (whose silicon content is quite high) is reacted with the carboxymethyl cellulose aqueous solution which is alkaline to generate gas bubbles in the resultant paste. An electrode structural body obtained by forming an electrode material layer on a collector by using the paste obtained in this case is problematic in that the adhesion between the electrode material layer and the collector is insufficient and the electrode resistance is increased. When this electrode structural body is used as the anode of a rechargeable lithium battery, the rechargeable lithium battery becomes to be such that the electricity storable capacity and the charge-and-discharge efficiency of the anode are lowered and the charge-and-discharge cycle life of the battery is shortened.

When the silicon fine powder or the silicon-based alloy fine power (whose silicon content is quite high) is mixed with an aqueous solution of polyvinyl alcohol or ethylene-vinyl alcohol polymer and the mixture is kneaded, there is formed a protective surface coat comprising polyvinyl alcohol or ethylene-vinyl alcohol polymer which covers the surface of the silicon fine powder or the silicon-based alloy fine power (whose silicon content is quite high), therefore after this, even when the resultant mixture is mixed with an aqueous solution of carboxymethyl cellulose and kneaded, the silicon fine powder or the silicon-based alloy fine power (whose silicon content is quite high) is not reacted with the carboxymethyl cellulose aqueous solution, where substantially not gas bubble is not generated in the paste afforded. Thus, the paste makes it possible to form an electrode material layer having a flat and uniform surface on a collector and which has a sufficient adhesion with the collector. Separately, it is possible that polyvinyl alcohol or ethylene-vinyl alcohol polymer and carboxymethyl cellulose are mixed and kneaded while adding water, and thereafter, the silicon fine powder or the silicon-based alloy fine power (whose silicon content is quite high) is added to the mixture, followed by being kneaded, where a desirable paste is afforded.

The rate occupied by the binder in the electrode material layer is desired to be preferably in a range of from 1 to 20 wt. % or more preferably in a range of from 2 to 10 wt. % in order to retain a large amount of an active material in the electrode material layer upon charging.

[Rechargeable Lithium Battery]

Figure 5:
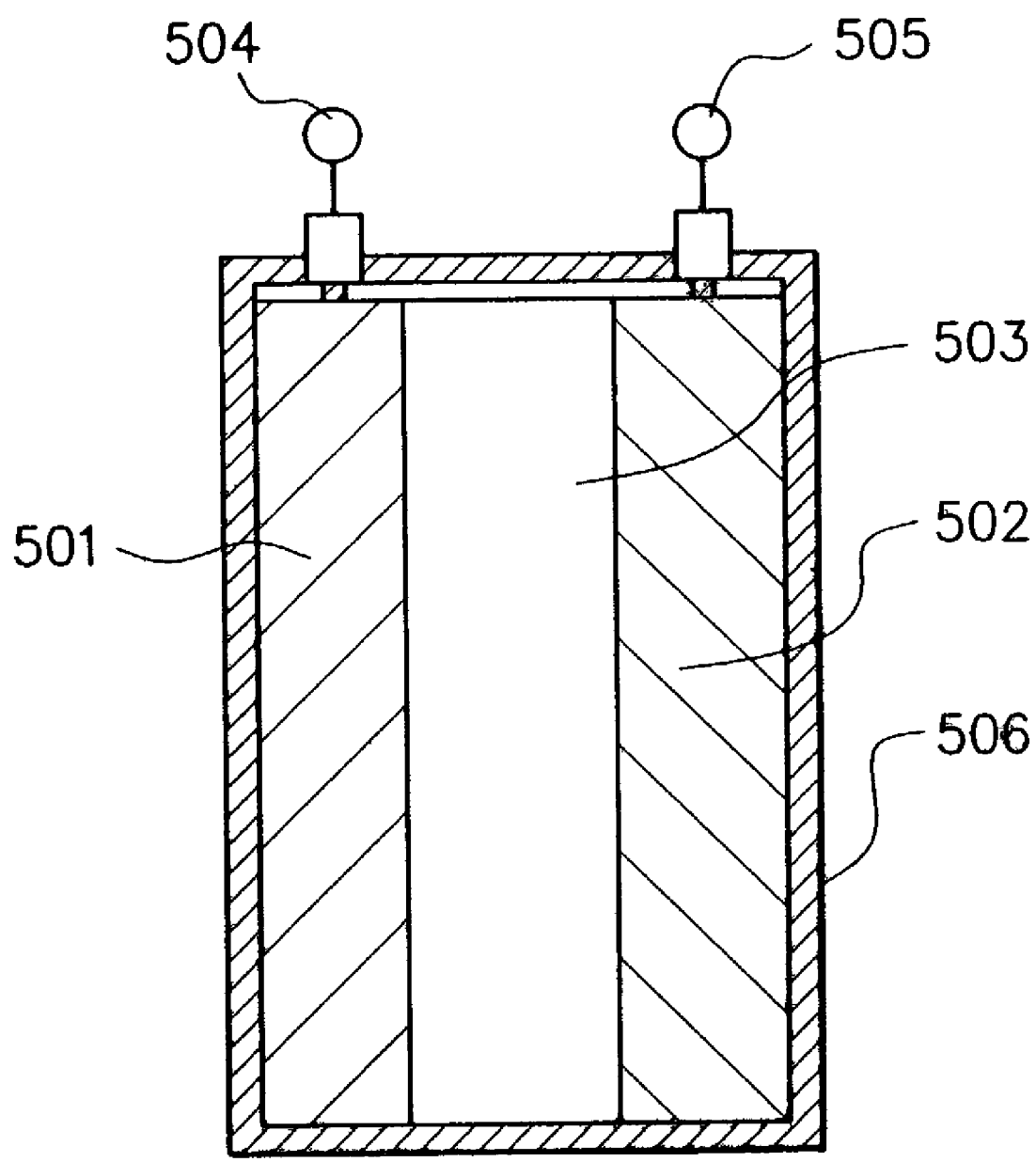
FIG. 5 is a schematic cross-sectional view illustrating a basic constitution of an example of a rechargeable lithium battery in the present invention.

FIG. 5 is a conceptual view schematically illustrating the structure of a rechargeable lithium battery according to the present invention. As shown in FIG. 5, an anode 501 comprising the foregoing electrode structural body of the present invention and a cathode 502 are accommodated in a battery housing 506 (a battery case) such that they are opposed to each other through an ion conductor 503 (an electrolyte). And an anode terminal 504 is electrically connected to the anode 501, and a cathode terminal 505 is electrically connected to the cathode 502.

In the present invention, an electrode structural body having such configuration as shown in FIG. 4(a) or FIG. 4(b) is used as the anode 501, where the anode 501 comprises a specific anode material fine powder of the present invention, having a quite small average particle size in a range of more than 0.1 µm to less than 0.5 µm and having a small crystallite size and which is expanded a little even when it is alloyed with lithium upon charging. Thus, the anode 501 has a high electricity storable capacity and a high charge-and-discharge efficiency, and volume expansion and volume shrinkage of the anode 501 are quite small in the battery housing 506 even when charge-and-discharge cycle is repeated, where the electrode material layer (which retains lithium upon charging) of the anode scarcely suffers fatigue failure due to the volume expansion and the volume shrinkage. This makes the rechargeable lithium battery have an improved energy density and a prolonged charge-and-discharge cycle life. Further, the anode material fine powder of the anode is electrochemically and evenly alloyed with lithium generated upon charging (that is, said lithium is efficiently inserted therein) and the release of the lithium upon discharging is smoothly performed, thus the anode has an excellent discharging performance.

The above advantages are more improved when the surface of the anode material fine powder constituting the anode is covered by an oxidation preventive surface coat film, preferably, an oxide surface coat film, where particularly, the anode material fine powder are prevented from being oxidized to diminish the amount of non-reversible lithium which is reacted with oxide in the anode material fine powder into a state incapable of being released upon discharging. The above advantages are further more improved when the surface of the anode material fine powder is covered by such oxidation preventive surface coat film and the anode material fine powder contains amorphous phase, where particularly, the magnitude of a change in the volume of the electrode material layer of the anode when lithium is inserted in the electrode material layer upon charging and said lithium is released upon discharging is more diminished and distortion occurred when the electrode material layer is expanded upon charging is greatly diminished.

[Anode 501]

As the anode 501 of the rechargeable lithium battery of the present invention, any of the foregoing electrode structural bodies 402 shown in FIGS. 4(a) and 4(b) can be used as it is.

[Cathode 502]

The cathode 502 comprises at least a cathode active material capable of being a host material for lithium ion. Preferably, the cathode comprises a layer formed of said cathode active material capable of being a host material for lithium ion and a collector. The layer formed of the cathode material is preferred to comprise said cathode active material capable of being a host material for lithium ion and a binder, if necessary, also an electrically conductive auxiliary.

As the cathode active material capable of being a host material for lithium ion used in the rechargeable lithium battery, lithium-transition metal oxides, lithium-transition metal sulfides, lithium-transition metal nitrides, and lithium-transition metal phosphates can be desirably used. The transition metal elements of these transition metal compounds can include transition metal elements having a d-shell or f-shell. Specific examples of such transition metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au.

In the case where the cathode active material is in a powdery form, a cathode active material layer is formed by mixing said powder cathode active material with a binder and applying the mixture on the collector or by sintering said powder cathode active material on the collector, whereby the cathode is formed. In the case where the conductivity of the powdery cathode active material is insufficient, as well as in the case of forming the electrode material layer (as the anode active material layer) for the foregoing electrode structural body, an adequate electrically conductive auxiliary is added. As said binder and said electrically conductive auxiliary, those mentioned in the above which are used for the formation of the electrode structural body (402) of the present invention may be used.

The collector of the cathode is preferred to be constructed by a metallic material which is highly electrically conductive and inactive to the battery reaction. Such metallic material can include Al, Ti, Pt, and Ni, and alloys of these metals such as stainless steel. Of these, Ni, Ti, Al, and alloys of these metals are particularly preferable. The cathode collector is desired to be in the form of a plate shape. The plate shape in this case may be of a thickness in a practical range. The plate shape can include a so-called "foil" configuration with a thickness of about 100 μm or less. Besides, it is possible to adopt a mesh member, a sponge member, a fibrous member, a punching metal member, and a expanded metal member, respectively in the form of a plate shape.

[Ion Conductor 503]

As the ion conductor used in the rechargeable lithium battery of the present invention, it is possible to use a separator having an electrolyte solution (obtained by dissolving a given electrolyte in an adequate solvent) retained therein, a solid electrolyte, or a solidified electrolyte obtained by gelling an adequate electrolyte solution by a high molecular gelling agent.

The ion conductor used in the rechargeable lithium battery of the present invention is necessary to have an ionic conductivity at 25° C. which is preferably more than $1 \times 10^{-3}$ S/cm or more preferably more than $5 \times 10^{-3}$ S/cm.

The electrolyte can include salts of $Li^+$ (lithium ion) with Lewis acid ion such as $BF_4^-$, $PF_6^-$, $AsF_6^-$, $ClO_4^-$, $CF_3SO_3^-$, or $BPh_4^-$ (with Ph being a phenyl group); and mixtures of these salts.

In any case, it is desired that the above salts are used after they are subjected to dehydration or deoxygenation, for example, by way of heat treatment under reduced pressure.

The solvent in which the electrolyte is dissolved can include acetonitrile, benzonitrile, propylene carbonate, ethylene carbonate, dimethyl carbonate, diethyl carbonate, dimethylformamide, ethylmethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitromethane, dimethyl sulfide, dimethyl sufoxide, methyl formate, 3-methyl-2-oxdazolydinone, 2-methyltetrahydrofuran, 3-propylsydonone, sulfur dioxide, phosphoryl chloride, thionyl chloride, sulfuly chloride, and mixtures of these.

These solvents are preferred to be subjected to dehydration using activated alumina, molecular sieve, phosphorous pentaoxide, or calcium chloride, prior to their use. Depending upon some of these solvents, it is desired for them to be subjected to distillation in an atmosphere composed of inert gas in the presence of an alkali metal, where moisture and foreign matter are removed.

In order to prevent leakage of the electrolyte solution, it is possible to use a solid electrolyte or a solidified electrolyte. The solid electrolyte can include a glass material such as an oxide material comprising lithium, silicon, phosphorus, and oxygen elements, a polymer chelate comprising an organic polymer having an ether structure. The solidified electrolyte can include those obtained by gelling a given electrolyte solution by a gelling agent to solidify said electrolyte solution. As the gelling agent, it is preferred to use a polymer having a property of absorbing the solvent of the electrolyte solution to swell or a porous material such as silicagel, capable of absorbing a large amount of liquid. Said polymer can include polyethylene oxide, polyvinyl alcohol, polyacrylonitrile, polymethylmethacrylate, and vinylidene-fluoride-hexafluoropropylene copolymer. And these polymers are preferred to have a cross-linking structure.

In order to further prolong the lifetime of the rechargeable lithium battery, it is preferred for the electrolyte solution to contain an additive selected from the group consisting of metal halides and amines in advance. Besides, said additive may be a compound selected from the group consisting of ammonium iodide, ammonium bromide and ammonium chloride. The metal halide can include metal iodides, metal bromides, and metal chlorides.

Specific examples of the metal iodide are zinc iodide, aluminum iodide, antimony iodide, ytterbium iodide, yttrium iodide, indium iodide, potassium iodide, calcium iodide, silver iodide, chromium iodide, silicon iodide, germanium iodide, cobalt iodide, samarium iodide, diethyl aluminum iodide, zirconium iodide, tin iodide, strontium iodide, cesium iodide, cerium iodide, thallium iodide, tungsten iodide, tantalum iodide, titanium iodide, iron iodide, copper iodide, sodium iodide, niobium iodide, nickel iodide, neodymium iodide, platinum iodide, vanadium iodide, hafnium iodide, palladium iodide, barium iodide, bismuth iodide, magnesium iodide, manganese iodide, molybdenum iodide, lanthanum iodide, lithium iodide, rhenium iodide, and rhodium iodide.

Specific examples of the metal bromide are zinc bromide, aluminum bromide, antimony bromide, ytterbium bromide, yttrium bromide, indium bromide, potassium bromide, calcium bromide, silver bromide, chromium bromide, silicon bromide, germanium bromide, cobalt bromide, samarium bromide, diethyl aluminum bromide, zirconium bromide, tin bromide, strontium bromide, cesium bromide, cerium bromide, thallium bromide, tungsten bromide, tantalum bromide, titanium bromide, iron bromide, copper bromide, sodium bromide, niobium bromide, nickel bromide, neodymium bromide, platinum bromide, vanadium bromide, hafnium bromide, palladium bromide, barium bromide, bismuth bromide, magnesium bromide, manganese bromide, molybdenum bromide, lanthanum bromide, lithium bromide, rhenium bromide, and rhodium bromide.

Specific examples of the metal chloride are zinc chloride, aluminum chloride, antimony chloride, ytterbium chloride, yttrium chloride, indium chloride, potassium chloride, calcium chloride, silver chloride, chromium chloride, silicon chloride, germanium chloride, cobalt chloride, samarium chloride, diethyl aluminum chloride, zirconium chloride, tin chloride, strontium chloride, cesium chloride, cerium chloride, thallium chloride, tungsten chloride, tantalum chloride, titanium chloride, iron chloride, copper chloride, sodium chloride, niobium chloride, nickel chloride, neodymium chloride, platinum chloride, vanadium chloride, hafnium chloride, palladium chloride, barium chloride, bismuth chloride, magnesium chloride, manganese chloride, molybdenum chloride, lanthanum chloride, lithium chloride, rhenium chloride, and rhodium chloride.

Specific examples of the amine are methylamine, ethylamine, propylamine, isopropylamine, butylamine, amylamine, hexylamine, heptylamine, octylamine, nonylamine, decylamine, ndecylamine, dodecylamine, tridecylamine, tetradecylamine, pentadecylamine, cetylamine, dimethylamine, diethylamine, dipropylamine, diisopropylamine, dibutylamine, diamylamine, trimethylamine, triethylamine, tripropylamine, tributylamine, triamylamine, allylamine, diallylamine, triallylamine, cyclopropylamine, cyclobutylamine, cyclopentylamine, cyclohexylamine, aniline, methylaniline, dimethylaniline, ethylaniline, diethylaniline, o-toluidine, m-toluidine, p-toluidine, benzylamine, dibenzylamine, tribenzyamine, diphenylamine, triphenylamine, alpha-naphthylamine, beta-naphthylamine, N,N-dimethylaminopyridine, 4-phenylbutylamine, N,N-diethylaminopyridine, methylaminopyridine, N,N-dimethylpyranopyridine, tributylamine, 2-phenylethylamine, 2-phenylbutylamine, 3-phenylbutylamine, 4-phenylbutylamine, 2-phenypropylamine, 3-phenypropylamine, 2-phenylethyl-N-methylamine, 2-phenylpropyl-N-methylamine, 3-phenylpropyl-N-methylamine, 2-phenylbutyl-N-methylamine, 3-phenylbutyl-N-methylamine, 4-phenylbutyl-N-methylamine, 2-phenylethyl-N-ethylamine, 2-phenylpropyl-N-ethylamine, 2-phenylbutyl-N-ethylamine, 3-phenylbutyl-N-ethylamine, 4-phenylbutyl-N-ethylamine, 2-phenylethyl-N,N-dimethylamine, 2-phenylpropyl-N,N-dimethylamine, 3-phenylpropyl-N,N-dimethylamine, 2-phenylbutyl-N,N-dimethylamine, 3-phenylbutyl-N,N-dimethylamine, 4-phenylbutyl-N,N-dimethylamine, 2-phenylethyl-N,N-diethylamine, 2-phenylpropyl-N,N-diethylamine, 3-phenylpropyl-N,N-diethylamine, 2-phenylbutyl-N,N-diethylamine, 3-phenylbutyl-N,N-diethylamine, and 4-phenylbutyl-N,N-diethylamine.

Of the above-mentioned additives, metal iodides which are alloyed with lithium in the charge-and-discharge process of the rechargeable lithium battery especially at ordinary temperature are more preferred. To be more specific, of these preferred metal iodides, aluminum iodide, tin iodide, silver iodide, and magnesium iodide are particularly preferable. Similarly, amines having a large molecular weight are preferred. Of these preferred amines, tributylamine, 4-phenylbutylamine, and N,N-dimethylpyridine are particularly preferable.

The present inventors guess that such metal iodide acts to increase the conductivity between the particles of the silicon fine powder or the silicon-based alloy fine powder as the anode material thereby to prevent occurrence of a phenomenon in that when lithium is deposited upon charging, said lithium reacts with impurities to form inactive lithium compounds. Separately, the present inventors guess that such amine acts to increase the conductivity of the electrolyte solution and to prevent hydrogen fluoride from being generated due to decomposition reaction of the electrolyte solution.

The amount of the metal halide or the amine to be added to the electrolyte solution is preferred to be in a range of from 100 to 1000 ppm.

It is more preferred that a mixture comprising at least one of the above-mentioned metal halides and at least one of the above-mentioned amines is added to the electrolyte solution.

The separator 503 is disposed between the anode 501 and the cathode 502, and it serves to prevent the anode and the cathode from suffering from internal-shorts. It also serves to retain an electrolyte therein depending upon the situation. The separator having the electrolyte retained therein functions as the ion conductor.

The separator is required to have a structure having a number of pores capable of allowing lithium ion to pass therethrough and it is also required to be insoluble into and stable to the electrolyte solution. The separator is preferred to be constituted by a nonwoven fabric or a memberane having a micropore structure, made of glass, a polyolefin such as polypropylene or polyethylene, or a fluororesin. Alternatively, the separator may be constituted by a metal oxide film or a resin film combined with a metal oxide, respectively having a plurality of micropores. In a preferred embodiment, the separator is constituted by a multilayered metal oxide film. Besides, the separator may be constituted by a metal oxide film or a resin film combined with a metal oxide, respectively having a number of pores.

[Shape and Structure of Rechargeable Lithium Battery]

The rechargeable lithium battery of the present invention may be in the form of a flat round shape, a cylindrical shape, a prismatic shape, or a sheet-like shape. The structure of the rechargeable lithium battery of the present invention may takes a single layer structure, a a multi-layered structure, a spiral-wound cylindrical structure, or the like. In the case where the rechargeable lithium battery is of a spiral-wound cylindrical structure, the anode, separator, and cathode are arranged in the named order and they are spiral-wound and because of this, it has advantages such that the battery area can be increased as desired and a high electric current can be flown upon charging and discharging. In the case where the rechargeable battery is of a prismatic structure or a single layer structure, there is an advantage in that the space of a device for housing the rechargeable lithium battery can be effectively utilized.

In the following, the shape and structure of a rechargeable lithium battery of the present invention will be detailed with reference to FIGS. 6 and 7.

Figure 6:
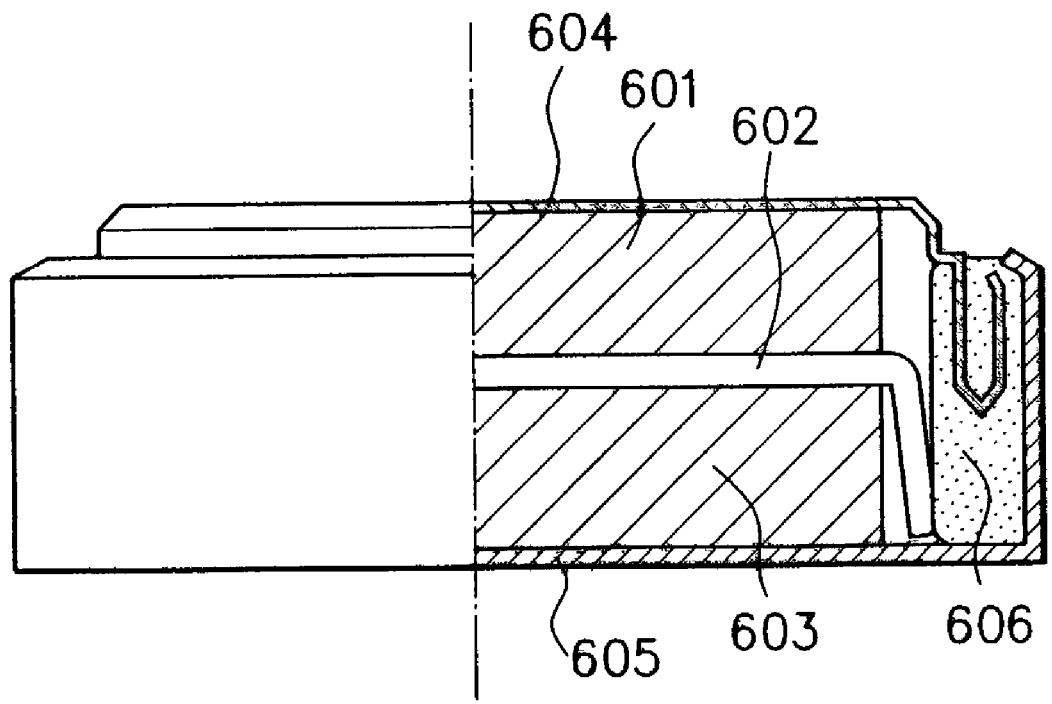
FIG. 6 is a schematic cross-sectional view illustrating an example of a single-layer structure type flat rechargeable lithium battery in the present invention.

FIG. 6 is a schematic cross-sectional view illustrating an example of a single-layer flat round type (coin type) rechargeable lithium battery according to the present invention. FIG. 7 is a schematic cross-sectional view illustrating an example of a spiral-wound cylindrical type rechargeable lithium battery according to the present invention.

Figure 7:
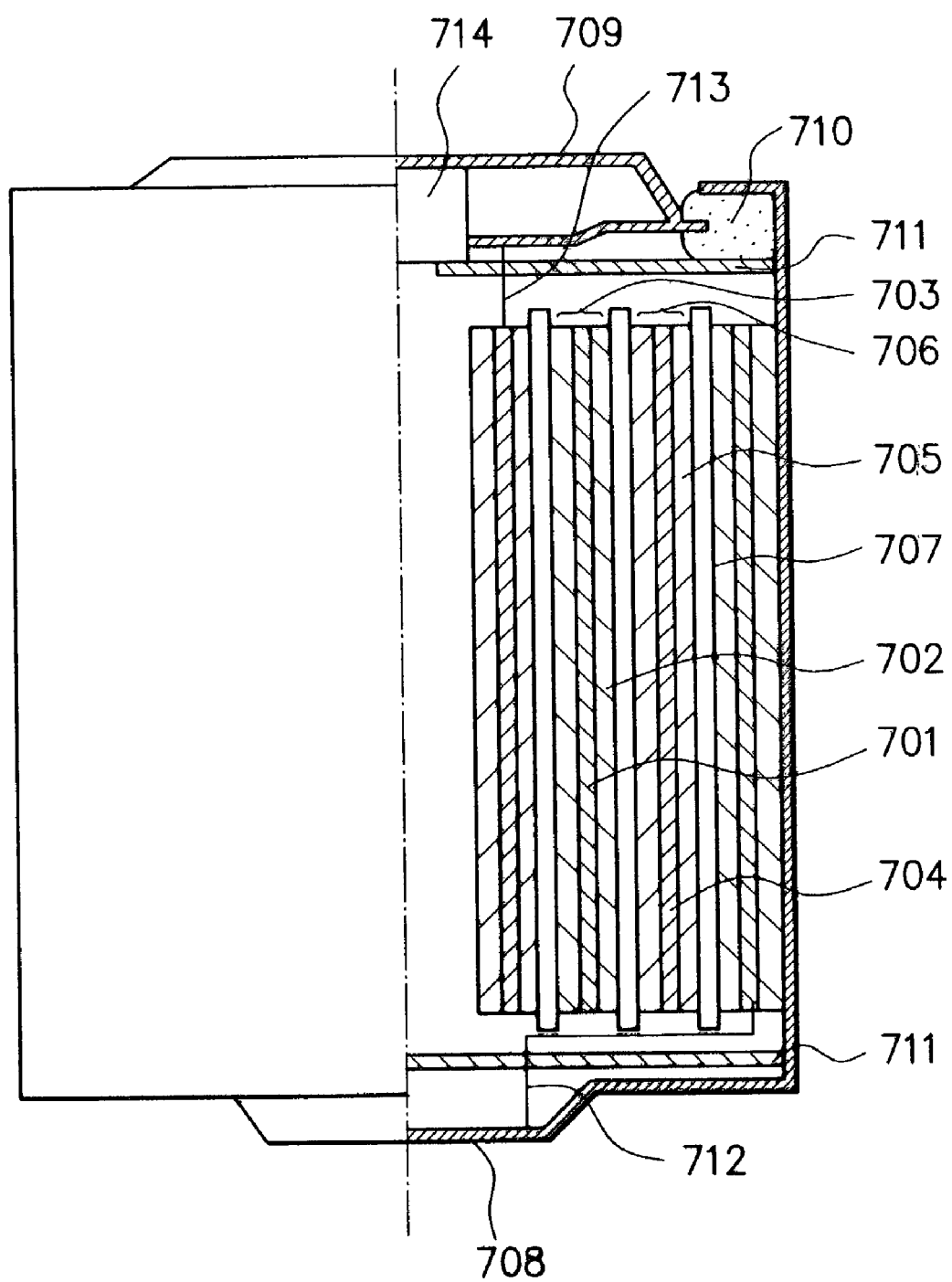
FIG. 7 is a schematic cross-sectional view illustrating an example of a spiral-wound cylindrical rechargeable lithium battery in the present invention.

In FIGS. 6 and 7, each of reference numerals 601 and 703 indicates an anode, each of reference numerals 603 and 706 a cathode, each of reference numerals 604 and 708 an anode terminal (an anode cap or an anode can), each of reference numerals 605 and 709 a cathode terminal (a cathode can or a cathode cap), each of reference numerals 602 and 707 an ion conductor, each of reference numerals 606 and 710 a gasket, reference numeral 701 an anode collector, reference numeral 704 a cathode collector, reference numeral 711 an insulating plate, reference numeral 712 an anode lead, reference numeral 713 a cathode lead, and reference numeral 714 a safety vent.

In the flat round type (coin type) rechargeable lithium battery shown in FIG. 6, the cathode 603 having a cathode material (active material) layer and the anode 601 having an anode material (active material) layer are stacked through the ion conductor 602 comprising a separator having at least an electrolyte solution retained therein to form a stacked body, and this stacked body is accommodated in the cathode can 605 as the cathode terminal from the cathode side, where the anode side is covered by the anode cap 604 as the anode terminal. And the gasket 606 is disposed in the remaining space of the cathode can.

In the spiral-wound cylindrical type rechargeable lithium battery shown in FIG. 7, the cathode 706 having a cathode material (active material) layer 705 formed on the cathode collector 704 and the anode 703 having an anode material (active material) layer 702 formed on the anode collector 701 are opposed to each other through the ion conductor 707 comprising a separator having at least an electrolyte solution retained therein, and wound in multiple to form a stacked body having a multi-wound cylindrical structure. The stacked body having the cylindrical structure is accommodated in the anode can 708 as the anode terminal. The cathode cap 709 as the cathode terminal is provided on the opening side of the anode can 708, and the gasket 710 is disposed in the remaining space of the anode can. The electrode stacked body of the cylindrical structure is isolated from the cathode cap side through the insulating plate 711. The cathode 706 is electrically connected to the cathode cap 709 through the cathode lead 713. The anode 703 is electrically connected to the anode can 708 through the anode lead 712. The safety vent 714 for adjusting the internal pressure of the battery is provided, on the cathode cap side.

In the above, each of the active material layer of the anode 601 and the active material layer 702 of the anode 703 comprises a layer comprising the foregoing anode material fine powder of the present invention.

In the following, description will be made of an example of a process for fabricating a rechargeable lithium battery having such configuration as shown in FIG. 6 or FIG. 7.

(1) A combination comprising the separator (602, 707) interposed between the anode (601, 703) and the cathode (603, 706) is positioned in the cathode can (605) or the anode can (708).

(2) The electrolyte is introduced thereinto, and the resultant is assembled with the anode cap (604) or the cathode cap (709) and the gasket (606, 710).

(3) The assembled body obtained in the step (2) is subjected to a caulking treatment, whereby the rechargeable lithium battery is completed.

In the battery production, the preparation of the materials of the rechargeable lithium battery and the assembly of the battery are desired to be conducted in a dry air atmosphere whose moisture having been sufficiently removed or in a dry inert gas atmosphere.

Description will be made of the members used in the fabrication of the above rechargeable lithium battery.

[Insulating Packing]

The gasket (606, 710) may be constituted by a fluororesin, a polyamide resin, a polysulfone resin, or a rubber material. The sealing of the battery may be conducted by way of glass-sealing, sealing using an adhesive, welding or soldering, besides the caulking using the insulating packing shown in the case shown in FIG. 6 or FIG. 7.

The insulating plate (711) shown in FIG. 7 may be constituted by a material selected from organic resin materials and ceramics.

[Battery Housing]

The battery housing comprises the cathode can or the anode can (605, 708), and the anode cap or the cathode cap (604, 709). Such battery housing preferably comprises a stainless steel sheet. Besides, it may comprise a titanium clad stainless steel sheet, a copper clad stainless steel sheet or a nickel plating steel sheet.

In the case of FIG. 6, the cathode can (605) also functions as the battery housing, and in the case of FIG. 7, the anode can (708) also functions as the battery housing, and therefore, the battery housing in each case is desired to comprise a stainless steel. However, in the case where neither the cathode can nor the anode can also functions as the electrode terminal, the material constituting the battery housing can include, other than said stainless steel, a metallic material of iron or zinc, a plastic material of polypropylene or the like, a composite material comprising a metallic material or a glass fiber and a plastic material.

[Safety Vent]

In the rechargeable lithium battery, a safety vent may be provided in order to ensure the safety when the internal pressure in the battery is increased. The safety vent may comprise a rubber, a spring, a metal ball or a rupture foil.

In the following, the present invention will be described in more detail with reference to examples. However, it should be understood that these examples are only for illustrative purposes and not intended to restrict the scope of the present invention to these examples.

EXAMPLE 1

There was prepared an anode material. Particularly, a silicon ingot was pulverized to obtain a course grained silicon powder. The course-grained silicon powder was subjected to a grinding treatment several times to obtain a silicon powder (with a purity of 99.6%) having an average particle size of 10 μm. This silicon powder and a graphite powder having an average particle size of 5 μm were mixed at a mixing weight ratio of 90:10 to obtain a mixture. The mixture was introduced into a media agitating mill, where it was subjected to a fine grinding treatment in a nitrogen gas atmosphere for 3 hours. A finely grained powder afforded in the mill was cooled to room temperature and it was taken out from the mill into the atmospheric air without being subjected to a treatment of forming an oxidation preventive surface coat film. Thus, there was obtain a silicon fine powder as an anode material fine powder.

The above procedures were repeated five times except for changing the grinding condition in the media agitating mill in each case. By this, there were obtained five kinds of anode material fine powders A, B, C, D, and E having a different average particle size of 0.28 μm, 1.4 μm, 2.4 μm, 3.1 μm, or 4.5 μm as shown in Table 1. The average particle size was measured by a particle size distribution analyzer.

For each of the five anode material fine powders A to E, there were prepared two electrode structural bodies (Sample 1 and Sample 2; see, Table 2) having such cross-sectional structure as shown in FIG. 4(b) as will be described below. The electrode structure prepared here functions as an anode when for example, a lithium-transition metal oxide is used as a counter electrode.

A plurality of electrode structural bodies were prepared as follows. A powdery graphite as the electrically conductive auxiliary was admixed to one of the five anode material fine powders A to E to obtain a mixture, the mixture was mixed with polyvinyl alcohol as the binder and ion-exchanged water and kneaded, successively carboxymethyl cellulose was added and kneaded, whereby a paste was obtained. The mixing weight ratio of these additives in each case was made to be as shown in Table 1. The resultant paste was applied on each of the opposite sides of a copper foil having a thickness of 18 μm and dried, and the resultant was subjected to pressing by means of a roll press machine, whereby an electrode structural body having an electrode material layer with a thickness of 40 μm on each of the opposite sides of the copper foil. In this way, there were prepared two electrode structural bodies (Sample 1 and Sample 2) for each of the five anode material fine powders A to E.

Evaluation

A rechargeable lithium battery of the present invention is typically fabricated by using an electrode structural body of the present invention as an anode in combination with a cathode comprising a lithium-transition metal oxide or the like. The performance of this rechargeable battery depends on not only the performance of the anode but also that of the cathode. In view of this, in order to accurately evaluate the performance of the electrode structural body used as the anode, it is necessary for the evaluation to be performed by an evaluation method in that the performance of the cathode is not influenced. In this example, the performance of the electrode structural body with respect to the ability to store and release lithium was evaluated by using an evaluation cell fabricated by using the electrode structural body of the present invention as a cathode and a lithium metal as an anode is used as will be described in the following.

Now, in order to evaluate each electrode structural body with respect to the function as the anode, the lithium insertion-and-release cycle test (the charge-and-discharge cycle test) was performed, where the insertion-and-release coulombic efficiency of lithium at the 10th cycle was evaluated.

Specifically, the lithium insertion-and-release cycle test was performed as follows.

Samples 1 and 2 for each of the anode material fine powders A to E were used respectively as a cathode (strictly speaking, as a cathode when the electrode structural body is subjected to discharging) and a lithium metal was used as an anode (strictly speaking, as an anode when the electrode structural body is subjected to discharging).

As the electrolyte solution, there was used an electrolyte solution obtained by dissolving 1 M (1 mol/l) of $LiBF_4$ as an electrolyte in a mixed solvent comprising ethylene carbonate and diethyl carbonate at a mixing ratio of 3:7.

An insertion-and-release coulombic efficiency of lithium at the 10th cycle was evaluated with respect to each of Samples 1 and 2 under the following conditions of the lithium insertion-and-release cycle test (the charge-and-discharge cycle test).

1st Cycle:

lithium is inserted (charging) at a current density of 0.16 $mA/cm^2$, and said lithium is released (discharging) at a current density of 0.5 $mA/cm^2$.

2nd Cycle and Thereafter:

lithium is inserted and released at a current density of 0.5 $mA/cm^2$, where pausing for 20 minutes is taken between the insertion and the release.

The lithium insertion-and-release cycle test was commenced from the insertion reaction and the lithium insertion-and-release cycle was repeated 10 times. The insertion-and-release coulombic efficiency was evaluated on the basis of a value [a specific capacity of the release of lithium/a specific capacity of the insertion of lithium×100] at the 10th cycle. In the lithium insertion-and-release cycle test, the cut-off capacity of the electrode material layer in the insertion reaction was set at 800 mAh/g and the cut-off voltage in the release reaction was set at 1.2 V.

As a result, the insertion-and-release coulombic efficiency at the 10th cycle of each sample was as shown in Table 2 and in FIG. 8.

FIG. 8 shows a graph (a curve) of insertion-and-release coulombic efficiencies of lithium at 10th discharge-and-charge cycle with respect to the five anode material fine powders having a given average particle size as the anode materials for a rechargeable lithium battery in relation to the average particle sizes of said anode material fine powders. The mark "●" in FIG. 8 is a measured value and the curve in FIG. 8 is of the relationships between the insertion-and-release coulombic efficiencies of lithium and the average particle sizes, estimated by linking the measured values.

From the curve of FIG. 8, it is possible to anticipate that when the average particle size falls in a range of less than 0.5 μm, an efficiency of the capacity (the electricity quantity) of the release of lithium to that of the insertion of lithium will exceed 98%.

After the above evaluation, in order to confirm appropriateness of the anticipation, the following test was conducted. The foregoing anode material fine powder B was put through a sieve to separate an anode material fine powder whose maximum particle size is less than 1 μm by excluding an anode material fine powder whose minimum size is more than 1 μm. The separated anode material fine powder was subjected to particle size measurement, as a result, it was found to have an average particle size of less than 0.5 μm. Using this anode material fine powder, an electrode structural body was prepared in accordance with the procedures for the preparation of an electrode structural body. The performance of the resultant electrode structural body was evaluated in accordance the foregoing evaluation method. As a result, the efficiency was found to be more than 80%. Thus, it was confirmed that aforesaid anticipation is appropriate.

EXAMPLE 2

The method for the preparation of an anode material fine powder in Example 1 was repeated, except that the powdery graphite was not used, and the fine grinding treatment in the agitating mill was conducted in a nitrogen gas atmosphere and under condition of affording a finely grained powder having a desired average particle size, and the atmosphere in the agitating mill was substituted by an oxygen-containing nitrogen gas having a prescribed oxygen content where the silicon fine powder afforded by the fine grinding treatment was agitated to react with the oxygen to form a thin oxide surface coat film on the surface of the silicon fine powder. The silicon fine powder whose surface is covered by said thin oxide surface coat film obtained was found to have an average particle size of less than 0.5 μm. After this, the silicon fine powder was taken out from the agitating mill in the atmospheric air, where the silicon fine powder was subjected to a heat treatment at a temperature 350° C. Thus, there was obtained an anode material fine powder. This procedure was repeated seven times, except that the oxygen content of the oxygen-containing nitrogen gas atmosphere was changed in a range of 0.05 to 21.0 vol. % in each case, to obtain seven kinds of anode material fine powders. Each of the seven anode material fine powders was found to have an oxygen element content as shown in Table 3.

For each of the seven anode material fine powders, there were prepared two electrode structural bodies (Sample 1 and Sample 2; see, Table 3) in the same manner as in Example 1.

Each of the resultant electrode structural bodies was evaluated with respect to its initial insertion-and-release coulombic efficiency of lithium at the 1st cycle in the lithium insertion-and-release cycle test in the same manner as in Example 1.

The evaluated initial insertion-and-release coulombic efficiencies are collectively shown in Table 3 and they are graphically shown in FIG. 10. The mark "●" in FIG. 10 is a measured value and the curve in FIG. 10 is of the relationships between the insertion-and-release coulombic efficiencies of lithium and the oxygen element contents, estimated by linking the measured values.

Now, as will be understood from the previous description, the present inventors obtained a finding during the course of having reached the present invention in that in order to prevent a silicon-based material fine powder (including a silicon fine powder) having a quite small average particle size in a range of more than 0.1 to less than 0.5 μm from being oxidized to deteriorate in terms of the characteristics, it is preferred to cover the surface thereof by an oxidation preventive surface coat film, for example, comprising a thin oxide film having a thickness suited to entirely cover the surface of the silicon fine powder at a thin thickness and in view of this, the oxygen element content of the silicon-based material fine powder is preferred to fall in a range of more than 0.5 wt. % to less than 5 wt. %, where an electrode material layer formed by using such silicon fine powder is satisfactory in terms of the insertion-and-release coulombic efficiency of lithium.

The smaller the oxygen element content of the silicon fine powder is, the better, because it is considered that the coulombic efficient when lithium is electrochemically inserted and released will be increased. However, when the oxygen element content is made to be less than 0.5 wt. %, the results of various experiments by the present inventors revealed to cause such phenomena as will be described below.

(1). When such silicon fine powder is heated in the air, it is rapidly reacted with the oxygen in the air to burn into an oxide. Even in the case where the silicon fine powder is not heated, it is gradually reacted with the oxygen where the oxide content therein is increased.

(2). When an electrode structural body is intended to prepare by using such silicon fine powder having a low oxygen element content and which is not sufficiently covered by an oxide surface coat film, the silicon powder is reacted with the oxygen upon the preparation of the paste to generate gas bubbles in the paste and in addition to this, silicon oxides are formed in the silicon fine powder. Because of this, the oxygen element content in the silicon fine power before the preparation of the electrode structural body becomes to be different from that after the preparation of the electrode structural body. Thus, in the case of an electrode structural body prepared by using a silicon fine powder originally having an oxygen element content of less than 0.5 wt. %, it can be said that the oxygen element content of the silicon fine powder in the electrode structural body is not less than 0.5 wt. % but is increased to exceed the 0.5 wt. %. In the case where the oxygen element content of the silicon fine powder is changed in this way, it is difficult to accurately evaluate the correlation between the oxygen element content and the coulombic efficiency.

The results shown in Table 3 and FIG. 10 prove the above-described situation. Although the oxygen element content which is smaller than 0.83 wt. % is not mentioned in Table 3, it is understood that when the oxygen element content in a range of from 0.83 to 4.61 which falls in the above-described range of more than 0.5 wt. % to less than 5 wt. %, the initial insertion-and-release coulombic efficiency is more than 80% which is excellent and that on the other hand, when the oxygen element content is more than 5 wt. % (here, when proportional calculation is performed from the initial coulombic efficiency when the oxygen element content is 4.61 wt. % and that when the oxygen element content is 6.81 wt. % in Table 3, the coulombic efficient when the oxygen element content is 5.0 wt. % becomes to be 81.3%), that is, 6.81 wt. % or more, the initial coulombic efficiency is less than 80% which is inferior.

In order to make a rechargeable lithium battery, which is fabricated by using an electrode structural body of the present invention as the anode and a lithium-transition metal oxide or the like is used as the cathode, to have a sufficiently long charge-and-discharge cycle life, it is necessary for the foregoing initial insertion-and-release coulombic efficiency to exceed 80%.

EXAMPLE 3

In accordance with the method for the preparation of an anode material fine powder in Example 1, there was prepared an anode material fine powder having an average particle size of 0.28 μm.

Using this anode material fine powder and in accordance with the method for the preparation of an electrode structural body in Example 1 except that the addition amount of the powdery graphite as the electrically conductive auxiliary was changed to fall in a range of from 10 wt. % to 76 wt. % (which is a weight proportion of the electrically conductive auxiliary versus the total weight amount of the anode material fine powder (the silicon-based material fine powder, powdery graphite, polyvinyl alcohol and carboxymethyl cellulose which are used in the preparation of the electrode structural body; see, Table 4), there were prepared two electrode structural bodies which are substantially the same with respect to the weight proportion of the electrically conductive auxiliary (Sample 1 and Sample 2) (see, Table 4).

Each of the resultant electrode structural bodies was evaluated with respect to the insertion-and-release coulombic efficiency of lithium at the 1st cycle and that at the 5th cycle. The evaluated results obtained are collectively shown in Table 4.

From the results, it is understood that when the addition amount of the electrically conductive auxiliary is more than 30 wt. %, the initial insertion-and-release coulombic efficiency of lithium becomes to be more than 80% and therefore, the addition amount of more than 30 wt. % is preferable.

For each of the samples in which the addition amount of the electrically conductive auxiliary was more than 50 wt. %, the lithium insertion-and-release cycle was repeated until the 10th during which the insertion-and-release efficiencies of lithium were measured. As a result, the following facts were obtained. That is, in the case where the addition amount of the electrically conductive auxiliary is 50 wt. %, the released lithium quantity at the 5th cycle was nearly equal to that at the 10th cycle. On the other hand, in the case where the addition amount of the electrically conductive auxiliary is 60 wt. %, the released lithium quantity at the 10th cycle was about 90% of that at the 5th cycle. Further, in the case where the addition amount of the electrically conductive auxiliary is 76 wt. %, the released lithium quantity at the 10th cycle was about 80% of that at the 5th cycle.

This result is considered to reveal that when the addition amount of the electrically conductive auxiliary is excessive, the quantity of lithium to be released is decreased to shorten the charge-and-discharge cycle life. Therefore, it is understood that the addition amount of the electrically conductive auxiliary is preferably less than 60 wt. % and more preferably less than 50 wt. %.

EXAMPLE 4

In this example, there was prepared a rechargeable lithium battery having such cross-sectional structure as shown in FIG. 7 and having a 18650 size [18 mm (diameter)×65 mm (height)] as will be described below.

1. Preparation of Anode (703):

In accordance with the method for the preparation of an anode material fine powder in Example 1, there was prepared an anode material fine powder having an average particle size of 0.28 μm. Using this anode material fine powder and in accordance with the method for the preparation of an electrode structural body in Example 1 except that the addition amount of the powdery graphite as the electrically conductive auxiliary was changed to 35 wt. %, 40 wt. %, 50 wt. %, or 60 wt. % (where as the binder, 7.5 wt. % of polyvinyl alcohol and 2.5 wt. % of carboxymethyl cellulose were used), there were prepared four kinds of electrode structural bodies corresponding to the four different addition amounts of the electrically conductive auxiliary.

Each of the four electrode structural bodies was cut into an electrode structural body having a prescribed size and a nickel lead (712) was spot-welded to the resultant electrode structural body.

Thus, there were obtained four kinds of anodes (703)

2. Preparation of Cathode (706):

(1). Lithium citrate and cobalt nitrate were mixed at a mol ratio of 1:3 to obtain a mixture, citric acid was added to the mixture, and the resultant was dissolved in ion-exchanged water to obtain a solution. The solution was sprayed in an air stream of 200° C. to obtain a Li-Co oxide precursor fine powder.

(2). The Li-Co oxide precursor fine powder obtained in the above was subjected to a heat treatment in an air stream of 850° C. to obtain a powdery Li-Co oxide.

(3). The powdery Li-Co oxide obtained in the above was mixed with 3 wt. % of a graphite powder and 5 wt. % of a polyvinylidene fluoride powder to obtain a mixture. The mixture was added with N-methyl-2-pyrroidone, followed by being stirred, to obtain a paste. The paste was applied on each of the opposite faces of an aluminum foil having a thickness of 20 μm as a cathode collector (704), followed by drying, to form a cathode active material layer (705) on each of the opposite faces of the collector. The resultant electrode structural body was subjected to press-forming by means of a rollpress machine, whereby the thickness of the cathode active material layer on each of the opposite faces of the collector was adjusted to be 90 μm. Then, the electrode structural body was cut to obtain four electrodes having a prescribed size. An aluminum lead (713) was welded to the collector of each electrode by means of an ultrasonic welding machine, followed by being dried at 150° C. under reduced pressure. Thus, there were obtained four cathodes (706).

3. Preparation of Electrolyte Solution:

(1). Ethylene carbonate (EC) whose moisture having been sufficiently removed and diethyl carbonate (DEC) whose moisture having been sufficiently removed were mixed at a mixing volume ratio of 3:7 to obtain a solvent.

(2). 1 M (mol/l) of lithium tetrafluoroborate (LiBF$_4$) was dissolved in the solvent obtained in the above to obtain an electrolyte solution.

4. Provision of Separator (707):

There were provided four separators comprising a 25 μm thick polyethylene member having a number of micropores.

By introducing the electrolyte solution at a later stage, the electrolyte solution becomes to be retained in the micropores of the separator, where the separator having the electrolyte solution therein functions as an ion conductor.

5. Fabrication of Rechargeable Lithium Battery:

The fabrication of a rechargeable lithium battery was conducted in a dry atmosphere controlled with respect to moisture with a dew point of less than −50° C.

(1). The separator (707) was sandwiched between the anode (703) and the cathode (706) such that the separator was partly protruded at each end side, followed by spirally winding about a given axis so as to form a structure of the separator/the cathode/the separator/the anode/the separator. The resultant was inserted in an anode can (708) made of a titanium clad stainless steel.

(2). The anode lead (712) was spot-welded to a bottom portion of the anode can (708). Then, a necking was formed at an upper portion of the anode can by means of a necking apparatus, and the cathode lead (713) was welded to the cathode cap (709) provided with a gasket (710) made of polypropylene by means of an ultrasonic welding machine.

(3). The electrolyte solution was introduced into the resultant obtained in the above (2), followed by putting the cathode cap (709) thereon, and the cathode cap (709) and the anode can (708) were caulked by a caulking machine. Thus, there was obtained a rechargeable lithium battery.

In this way, there were prepared four rechargeable lithium batteries.

Each rechargeable lithium battery was made to be of an anode capacity-controlled type in that the cathode capacity was made to be larger than the anode capacity.

Evaluation

For each of the four rechargeable lithium batteries obtained in this example, evaluation was conducted with respect to charge-and-discharge cycle life.

The charge-and-discharge cycle life of each rechargeable lithium battery was evaluated in the following manner. The charge-and-discharge cycle test was conducted by repeating a cycle of alternately performing charging and discharging at a constant electric current of 0.5 C (an electric current of 0.5 time a value of the capacity/the time) on the basis of the discharged electricity quantity (capacity) in the third cycle in the above capacity test and taking a pause for 10 minutes. And the number of the charge-and-discharge cycles when the discharge capacity became less than 60% of the third discharge capacity was made to be a charge-and-discharge cycle life for the battery.

The evaluated results obtained in the above are shown in Table 5. The values shown in Table 5 are values relative to the value of the charge-and-discharge cycle life in the case where the addition amount of the electrically conductive auxiliary was 60 wt. %, which is set at 1. From Table 5, in a viewpoint of the charge-and-discharge cycle life, it is understood that the addition amount of the electrically conductive auxiliary is made to fall in a range of from 40 to 50 wt. %, the cycle life is prolonged.

EXAMPLE 5

In this example, an anode material fine powder was prepared, an anode (comprising an electrode structural body which can function as an anode, for instance, in the case where a lithium-transition metal oxide is used as a counter electrode) was prepared using said anode material fine powder, and an evaluation cell was prepared using said anode.

[Preparation of Anode Material Fine Powder]

(1). 65 wt. % of a silicon (Si) powder, 30 wt. % of a tin (Sn) powder, and 5 wt. % of a copper (Cu) powder were mixed to obtain a mixture. The mixture was fused to obtain a fused alloy. The fused allow was subjected to an atomization treatment by a water-atomizing method to obtain a Si-Sn-Cu alloy (whose principal component is silicon) powder having an average particle size of 10 μm. (This Si—Sn—Cu alloy powder will be hereinafter referred to as "silicon-based alloy powder".)

(2). The alloy powder obtained in the above was subjected to a fine grinding treatment by a beads mill (that is, a ball mill in which beads having a relatively small diameter are used as a grinding media) to obtain a silicon-based alloy fine powder having an average particle size of 0.28 μm. The fine grinding treatment in the beads mill was conducted in isopropyl alcohol by using zirconia beads.

(3). The silicon-based alloy fine powder obtained in the above was introduced into a high energy planetary ball mill, where the silicon-based alloy fine powder was subjected to an amorphization treatment in an argon gas atmosphere using balls made of silicon nitride. In this case, it is possible to add isopropyl alcohol in an amount of 8 wt. % versus the weight amount of the silicon-based alloy fine powder. Alternatively, it is possible to add a graphite powder in an amount of about 2 wt. % together with or instead of the isopropyl alcohol.

A sample of the silicon-based alloy fine powder having been subjected to the amorphization treatment was subjected to X-ray diffraction analysis to an X-ray diffraction chart. The half-value width of each of the peaks obtained from the X-ray diffraction chart were substituted into the previously described Scherr's equation to obtain a crystallite size in a range of from 10 to 30 nm. Thus, the silicon-based alloy fine powder having been subjected to the amorphization treatment was found to have been amorphizated.

[Preparation of Anode(Silicon-based Alloy Electrode)]

(1). 66.5 wt. % of the amorphizated silicon-based alloy fine powder obtained in the above, 10.0 wt. % of a graphite powder (comprising disk-like shaped particles having a diameter of about 5 μm and a thickness of about 1 μm), 6.0 wt. % of a graphite powder (comprising nearly round-shaped particles having an average particle size in a range of from 0.5 to 1.0 μm), 4.0 wt. % of an acetylene black powder (comprising nearly round-shaped particles having an average particle size of $4 \times 10^{-2}$ μm, 10.5 wt. % of polyvinyl alcohol and 3.0 wt. % of carboxymethyl cellulose respectively as a binder were mixed and kneaded while adding water to obtain a paste.

(2). The paste obtained in the above was applied on a field copper foil (an electrochemically produced copper foil) having a thickness of 15 μm by means of a coater and dried, and the thickness of the layer formed on the copper foil was adjusted to obtain an electrode structural body having an active material layer with a thickness of 25 μm.

The resultant electrode structural body was cut to an square size of 2.5 cm×2.5 cm and a copper tub was welded to obtain a silicon-based alloy electrode.

[Evaluation of Ability of Storing and Releasing Lithium]

(1). A lithium metal foil having a thickness of 100 μm was contact-bonded to a copper foil to obtain a lithium electrode having a square size of 2.5 cm×2.5 cm.

(2). 1 M (mol/l) of $LiPF_6$ as an electrolyte was dissolved in a mixed solvent comprising ethylene carbonate and diethyl carbonate at a mixing ratio of 3:7 to obtain an electrolyte solution.

The electrolyte solution was impregnated in a porous polyethylene film having a thickness of 25 μm.

The foregoing silicon-based alloy electrode was arranged one of the opposite faces of the polyethylene film and the above lithium electrode was arranged on the remaining face of the polyethylene film so that the polyethylene film was sandwiched between a pair of the silicon-based alloy electrode and the lithium electrode, whereby a stacked body was obtained. In order to make the stacked body to be flat, the stacked body was pinched from the both sides by a pair of glass plates.

Then, the resultant was covered by an aluminum-laminated film which comprises an outermost layer comprising a nylon film, a middle layer comprising an aluminum foil having a thickness of 20 μm and an inside layer comprising a polyethylene film being laminated. The output terminal portions of each electrode were sealed by way of fusion without being laminated.

Thus, there was obtained an evaluation cell.

[Evaluation]

In order to evaluate the performance of the foregoing electrode structural body as the anode of a rechargeable lithium battery, the lithium insertion-and-release cycle test (the charge-and-discharge cycle test) was performed.

The above evaluation cell was electrically connected to a charge-and-discharge apparatus by making the lithium electrode to be an anode and making the silicon-based alloy electrode to be a cathode. First, the evaluation cell was discharged at a current density of 0.112 mA/cm$^2$ (0.07 A per 1 g of the active material layer, that is, 0.07A/the weight(g) of the electrode material layer) to insert lithium in the electrode material layer of the silicon-based alloy electrode, then the evaluation cell was charged at a current density of 0.320 mA/cm$^2$ (0.2 A/the weight (g) of the electrode material layer) to release lithium from the electrode material layer of the silicon-based alloy electrode, where the specific capacity per a unit weight of the electrode material layer (or the silicon-based alloy powder) when lithium is inserted and released was evaluated.

Figure 11A:
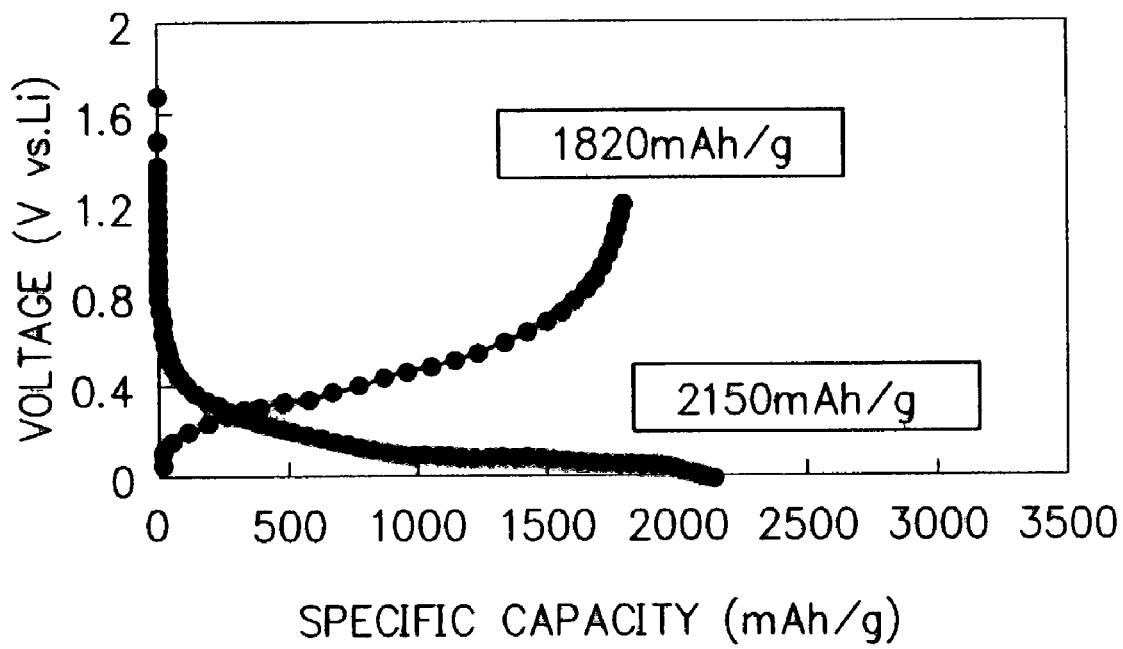
FIGS. 11(a) and 11(b) show discharge-and-charge curves of silicon alloy electrodes (comprising a fine powder of a silicon alloy principally comprising silicon element and containing tin element and copper element as minor component) as anodes for a rechargeable lithium battery, obtained in Example 5 which will be described later.
Figure 11B:
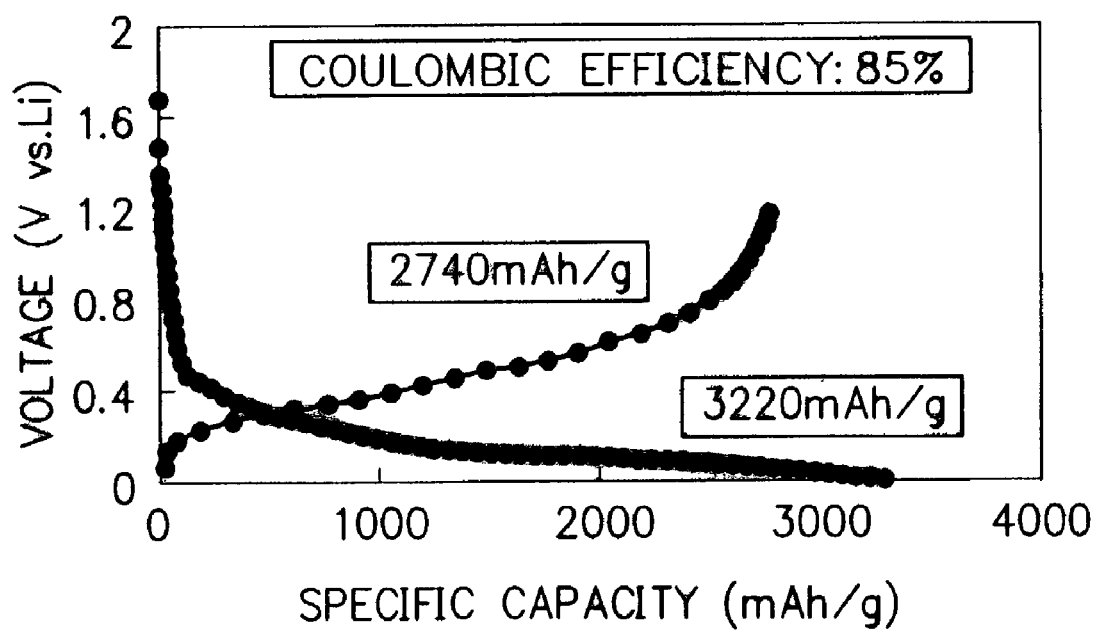

FIGS. 11(a) and 11(b) show respectively a lithium insertion-and-release curve, where the abscissa is of a specific capacity when lithium is inserted and released and the ordinate is of a voltage of the cell. To be more specific, FIG. 11(a) shows a transition of the specific capacity per 1 g of the electrode material layer (which corresponds to a portion of the electrode from which the collector is excluded; and which corresponds to a portion comprising the silicon-based alloy powder, the electrically conductive auxiliary and the binder in this example). Similarly, FIG. 11(b) shows a transition of the specific capacity per 1 g of the alloy.

Based on the results shown in FIGS. 11(a) and 11(b), there was obtained a finding that the silicon-based alloy electrode prepared in this example increases the quantity of lithium to be inserted and released and it is possible to store a large electricity quantity (that is, for instance, 2700 mAh/g) per a unit weight of the silicon-based alloy which is about 8 times that of the graphite and also to release said electricity.

EXAMPLE 6

In this example, a silicon powder with a purity of 99.6% and having an average particle size of 10 mμ instead of the Si—Sn—Cu alloy powder used in Example 5 was subjected to a fine grinding treatment in the same manner as in Example 5, followed by subjecting to an amorphization treatment in the same manner as in Example 5 to obtain an amorphized silicon fine powder. The amorphized silicon fine powder was found to have a crystallite size of less than 30 nm.

Using this silicon fine powder, there were prepared an electrode structural body and an evaluation cell in the same manner as in Example 5.

By using the evaluation sell, the performance of the electrode structural body as the anode of a rechargeable lithium battery was evaluated in the same manner as in Example 5. As a result, the electrode was found to be able to store and release an electricity quantity of 1700 mAh/g per a unit weight of the silicon powder.

Separately, the electrochemical insertion-and-release of lithium was repeated by controlling the electricity quantity with respect to the lithium insertion quantity to 900 mAh/g (1250 mAh/g per a unit weight of the silicon powder. As a result, a lithium insertion-and-release efficiency of 99.5% and a specific capacity exceeding 700 mAh/g per a unit weight of the active material layer could be maintained even when the lithium insertion-and-release cycle was repeated 100 times.

EXAMPLE 7

In this Example, an electrode structural body as an anode for a rechargeable lithium battery was prepared and the performance of the electrode structural body was evaluated.

[Preparation of Anode (Silicon-based Alloy Electrode)]

In accordance with the method for the preparation of an amorphized silicon-based fine powder, there was prepared an amorphized Si—Sn—Cu alloy fine powder having an average particle size of 0.28 μm (the weight composition ratio of Si, Sn and Cu of the Si—Sn—Cu alloy is 65:30:5).

66.5 wt. % of the amorphized Si—Sn—Cu alloy fine powder obtained in the above, 20 wt. % of a natural graphite powder having an average particle size of 5 μm, 5.0 wt. % of an acetylene black powder, 3.0 wt. % of carboxymethyl cellulose (used in a 2 wt. % aqueous solution), and 7 wt. % of polyvinyl alcohol (used in a 10 wt. % aqueous solution) were mixed and kneaded by means of a planetary mixer to obtain a paste.

The paste (in an amount to become 2.0 mg/cm$^2$ in a dried state) was applied on a field copper foil having a thickness of 15 μm by means of a coater and dried at a temperature of 80° C. for 10 minutes, and the thickness of the layer formed on the copper foil was adjusted to obtain an electrode structural body having an active material layer with a thickness of 25 μm.

The resultant electrode structural body was cut to an square size of 2.5 cm×2.5 cm and a copper tub was welded to obtain a silicon-based alloy electrode which can function as an anode, for instance, in the case where a lithium-transition metal oxide is used as a counter electrode.

[Evaluation of the Performance of the Electrode Structural Body as the Anode for a Rechargeable Lithium Battery]

(1). A lithium metal foil having a thickness of 100 μm was contact-bonded to a textured surface of a copper foil to obtain a lithium electrode having a square size of 2.5 cm×2.5 cm.

(2). A nickel ribbon capable of serving as a terminal was welded to each of the foregoing silicon-based alloy electrode and the above lithium electrode by way of ultrasonic welding.

(3). The silicon-based alloy electrode was arranged one of the opposite faces of a porous polyethylene film having a thickness of 25 μm as a separator and the lithium electrode was arranged on the remaining face of the polyethylene film so that the polyethylene film was sandwiched between a pair of the silicon-based alloy electrode and the lithium electrode, whereby a stacked body was obtained. The stacked body was pinched from the both sides by a pair of glass plates and fixed by an adhesive tape of polyimide. The resultant was vacuum-dried at a temperature of 80° C. for 5 hours and thereafter, it was covered by a laminate film which comprises an outermost layer comprising a nylon film, a middle layer comprising an aluminum foil having a thickness of 20 μm and an inside layer comprising a polyethylene film being laminated.

Then, 1 mol of an electrolyte solution obtained by dissolving 1 M (mol/l) of $LiPF_6$ as an electrolyte in a mixed solvent comprising ethylene carbonate and diethyl carbonate at a mixing ratio of 3:7 and dissolving an aluminum iodide in an amount of 100 ppm in said solvent was introduced into the stacked body covered by the laminate film. Thus, there was obtained an evaluation cell. The fabrication of the evaluation cell was conducted in a dry atmosphere controlled with respect to moisture with a dew point of less than −60° C.

(4). In order to evaluate the performance of the foregoing electrode structural body as the anode of a rechargeable lithium battery, the lithium insertion-and-release cycle test (the charge-and-discharge cycle test) was performed.

The above evaluation cell was electrically connected to a charge-and-discharge apparatus by making the lithium electrode to be an anode and making the silicon-based alloy electrode to be a cathode. First, under atmospheric condition of 25° C., the evaluation cell was discharged at a current density of 0.112 mA/cm$^2$ (0.07 A per 1 g of the active material layer, that is, 0.07A/the weight(g) of the electrode material layer) to insert lithium in the electrode material layer of the silicon-based alloy electrode until 1000 mAh/g per a unit weight of the electrode material layer, then the evaluation cell was charged at a current density of 0.320 mA/cm$^2$ (0.2 A/the weight (g) of the electrode material layer) to release lithium from the electrode material layer of the silicon-based alloy electrode until the cell voltage became to be 1.2 V, where the specific capacity per a unit weight of the electrode material layer (or the silicon-based alloy powder) when lithium is inserted and released was evaluated.

Figure 12:
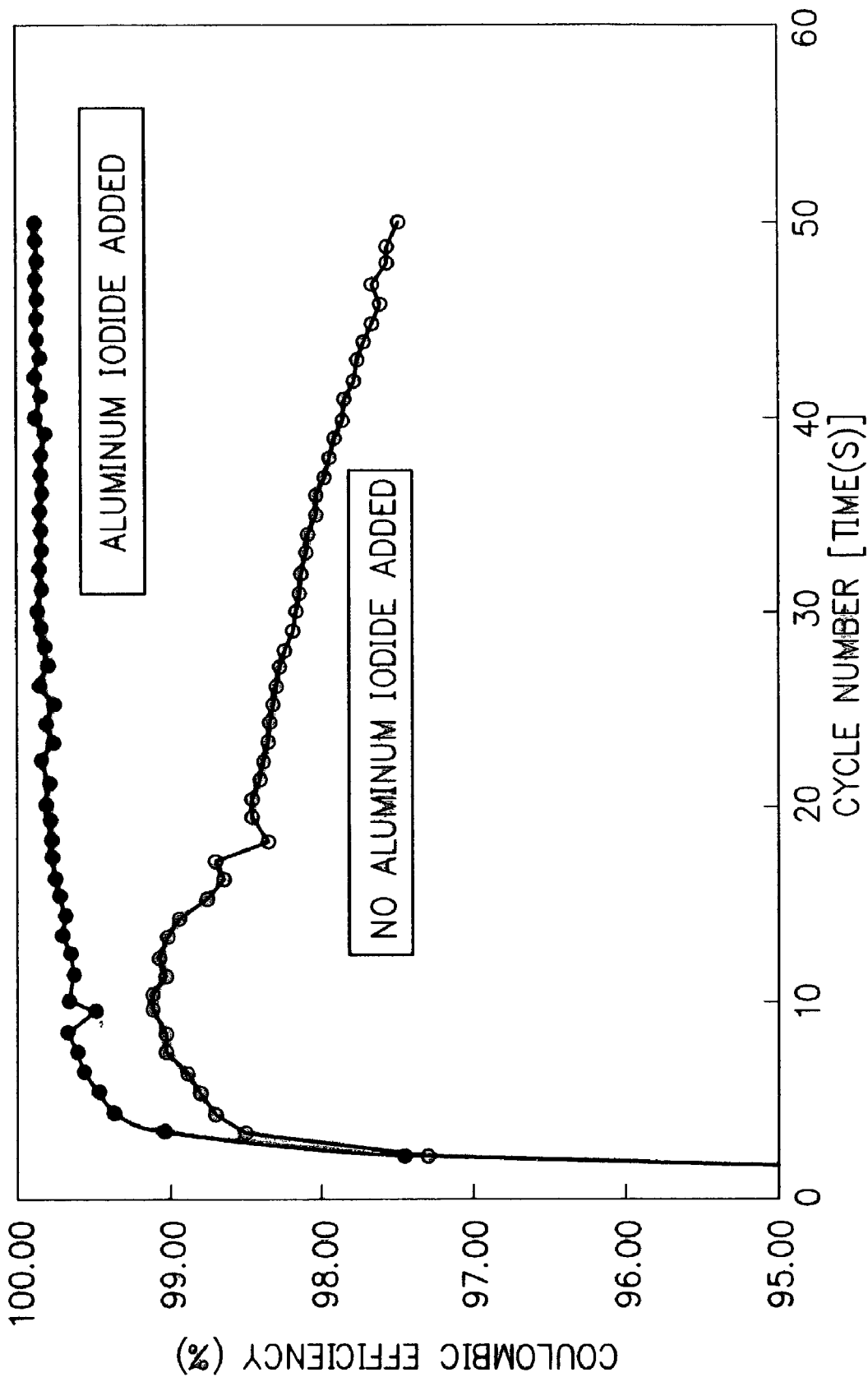
FIG. 12 shows a graph of relationships between discharge-and-charge efficiencies and the number of discharge-and-charge cycle when electrode materials (comprising a fine powder of a silicon alloy principally comprising silicon element and containing tin element and copper element as minor component) were used as anode materials for a rechargeable lithium battery wherein an electrolyte solution added with aluminum iodide was used and a graph of relationships between discharge-and-charge efficiencies and the number of discharge-and-charge cycle when electrode materials (comprising a fine powder of a silicon alloy principally comprising silicon element and containing tin element and copper element as minor component) were used as anode materials for a rechargeable lithium battery where an electrolyte solution with no addition of aluminum iodide was used, obtained in Example 6 which will be described later.

As a result, the silicon-based alloy electrode (the electrode structural body) of this example was found to a greatly prolonged charge-and-discharge cycle life as shown in FIG. 12.

Figure 13:
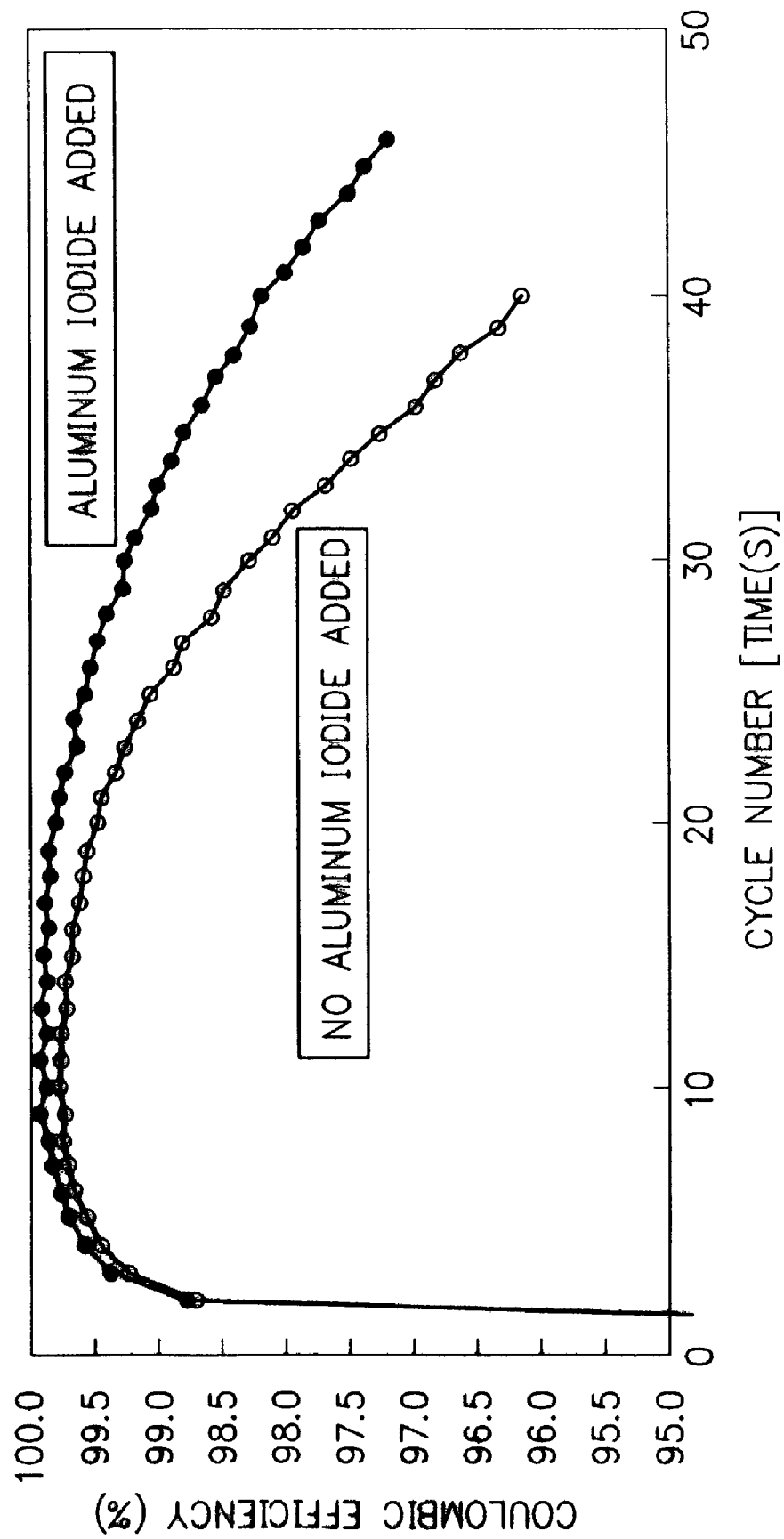
FIG. 13 shows a graph of relationships between discharge-and-charge efficiencies and the number of discharge-and-charge cycle when electrode materials (comprising a silicon fine powder) added with aluminum iodide were used as cathodes for a rechargeable lithium battery and a graph of relationships between charge-and-discharge efficiencies and the number of charge-and-discharge cycle when electrode materials (comprising a silicon fine powder) with no addition of aluminum iodide were used as anode materials for a rechargeable lithium battery, obtained in Example 6 which will be described later.

Separately, an evaluation cell was prepared in accordance with the above described method except for changing the silicon-based ally electrode to a silicon electrode prepared using a silicon fine powder for which such amorphization treatment as described in Example 6 has not been conducted, and using said evaluation cell, silicon electrode was evaluated by the above-described evaluation method. As a result, the silicon electrode was found to have such characteristics as shown in FIG. 13.

In consequence of the above results, it was found that the lithium insertion-and-release cycle life of the silicon-based alloy electrode and that of the silicon electrode are prolonged by the addition of a metal halide such as aluminum iodide or the like.

As will be understood from what described in the above, it is understood that the present invention has various advantages as will be described in the following.

The present invent provides a high performance electrode material for a rechargeable lithium battery, comprising a silicon-based material fine powder having an average particle size in a range of more than 0.1 µm to less than 0.5 µm. This electrode material makes it possible to form an electrode material layer which allows lithium to be efficiently inserted and stored therein upon charging and allows said lithium to be released therefrom upon discharging and which is difficult to expand upon the insertion of lithium and is difficult to shrink upon the release of said lithium, where only the initial insertion-and-release coulombic efficiency of lithium but also the insertion-and-release coulombic efficiency of lithium at the 10th charge-and-discharge cycle are maintained at a high level. When the silicon-based material fine powder contains oxygen element in a rage of more than 0.5 wt. % to less than 5 wt. % such that the surfaces of the particles constituting the silicon-based material fine powder are covered by a thin oxidation preventive surface coat film, the silicon-based material fine powder is prevented from being oxidized, and because of this, the above advantages are more improved.

Further, when the silicon-based material fine powder is amorphized, the electrode material layer has a more improved capacity which makes the electricity quantity which serves to store and release lithium to exceed 1000 mAh/g per a unit weight of the electrode material layer. In addition, when the silicon-based material of the silicon-based material fine powder is a silicon-based alloy containing Si in a major amount in a range of more than 50 wt. % and containing Sn and a transition metal element, the electrode material layer a further improved capacity which makes the electricity quantity which serves to store and release lithium to be more than 2700 mAh/g per a unit weight of the electrode material layer.

TABLE 1

| | average particle size (µm) | admixed proportion(wt. %) | | | |
|---|---|---|---|---|---|
| | | anode material fine powder | graphite | polyvinyl alcohol | carboxymethyl cellulose |
| A | 0.28 | 50 | 40 | 7.5 | 2.5 |
| B | 1.4 | 40 | 50 | 7 | 3 |
| C | 2.4 | 40 | 50 | 7 | 3 |
| D | 3.1 | 40 | 50 | 7 | 3 |
| E | 4.5 | 40 | 50 | 7 | 3 |

TABLE 2

| | insertion-and-release coulombic efficiency of lithium at 10th charge-and-discharge cycle | |
|---|---|---|
| | Sample 1 | Sample 2 |
| A | 98.7 | 99.1 |
| B | 97.1 | 97.1 |
| C | 97.0 | 97.2 |
| D | 96.0 | 95.8 |
| E | 94.6 | 94.6 |

TABLE 3

| oxygen element | initial insertion-and-release coulombic efficiency of lithium(%) | |
|---|---|---|
| content(wt. %) | Sample 1 | Sample 2 |
| 0.83 | 83.8 | 84.3 |
| 0.86 | 84.8 | 84.9 |
| 1.03 | 83.7 | 84.2 |
| 2.94 | 86.7 | 87.0 |
| 4.61 | 82.0 | 82.1 |
| 6.81 | 77.2 | 78.4 |
| 16.89 | 58.0 | 59.0 |

TABLE 4

| content proportion of electrically conductive auxiliary | insertion-and-release coulombic efficiency of lithium at 1st charge-and-discharge cycle(%) | | insertion-and-release coulombic efficiency of lithium at 5th charge-and-discharge cycle(%) | |
|---|---|---|---|---|
| | Sample 1 | Sample 2 | Sample 1 | Sample 2 |
| 10 wt. % | 75.8 | 76.3 | 89.4 | 91.8 |
| 20 wt. % | 78.8 | 79.3 | 96.3 | 96.8 |
| 30 wt. % | 81.9 | 82.5 | 97.7 | 97.6 |
| 40 wt. % | 82.7 | 82.8 | 97.3 | 97.6 |
| 50 wt. % | 86.0 | 86.1 | 98.7 | 98.7 |
| 60 wt. % | 87.8 | 88.1 | 98.7 | 98.4 |
| 76 wt. % | 91.3 | 92.1 | 98.7 | 102.3 |

TABLE 5

| content proportion of electrically conductive auxiliary(wt. %) | charge-and-discharge cycle life(relative value) |
|---|---|
| 35 | 1.1 |
| 40 | 1.7 |
| 50 | 2.0 |
| 60 | 1 |

What is claimed is:

1. An electrode material for a rechargeable lithium battery, characterized in that said electrode material comprises a fine powder of a silicon-based material whose principal component is Si, wherein said silicon-based material is a silicon alloy containing Si in an amount in a range of from 50 to 90 wt. %, Sn in an amount in a range of from 9 to 49 wt. %, and a transition metal element in a range of from 1 to 15 wt. %, wherein said silicon alloy contains Cu.

2. An electrode material for a rechargeable lithium battery, characterized in that said electrode material comprises a fine powder of a silicon-based material whose principal component is Si, wherein said silicon-based material is a silicon alloy containing Si in an amount in a range of from 50 to 90 wt. %, Sn in an amount in a range of from 9 to 49 wt. %, and a transition metal element in a range of from 1 to 15 wt. %, wherein said silicon alloy contains oxygen element (O) in an amount in a range of 0.5 wt. % [O]≦5 wt. %.

3. The electrode material according to claims 1 or 2, wherein said fine powder has an average particle size (R) in a range of 0.1 µm≦R<0.5 µm.

4. The electrode material according to claims 1 or 2, wherein said fine powder has an oxidation preventive surface coat film which covers the surface of said fine powder.

5. The electrode material according to claim 4, wherein said oxidation preventive surface coat film comprises an oxide film.

6. The electrode material according to claim 4, wherein said oxidation preventive surface coat film comprises a polymer film.

7. The electrode material according to claims 1 or 2, wherein said fine powder is an amorphous phase-bearing fine powder.

8. An electrode structural body for a rechargeable lithium battery, characterized in that said electrode structural body has a fine powder of a silicon-based material whose principal component is silicon element, wherein said silicon-based material is a silicon alloy containing Si in an amount in a range of from 50 to 90 wt. %, Sn in an amount in a range of from 9 to 49 wt. %, and a transition metal element in an amount in a range of from 1 to 15 wt. %, wherein said silicon alloy contains Cu.

9. An electrode structural body for a rechargeable lithium battery, characterized in that said electrode structural body has a fine powder of a silicon-based material whose principal component is silicon element, wherein said silicon-based material is a silicon alloy containing Si in an amount in a range of from 50 to 90 wt. %, Sn in an amount in a range of from 9 to 49 wt. %, and a transition metal element in an amount in a range of from 1 to 15 wt. %, wherein said silicon alloy contains oxygen element (O) in an amount in a range of 0.5 wt. %≦[O]≦5 wt. %.

10. The electrode structural body according to claims 8 or 9, wherein said fine powder has an average particle size (R) in a range of 0.1 µm≦R<0.5 µm.

11. The electrode structural body according to claims 8 or 9, wherein said fine powder is an amorphous phase-bearing fine powder.

12. The electrode structural body according to claims 8 or 9, wherein said fine powder has an oxidation preventive surface coat film which covers the surface of said fine powder.

13. The electrode structural body according to claim 12, wherein said oxidation preventive surface coat film comprises an oxide film.

14. The electrode structural body according to claim 12, wherein said oxidation preventive surface coat film comprises a polymer film.

15. The electrode structural body according to claim 14, wherein said fine powder is an amorphous phase-bearing fine powder.

16. The electrode structural body according to claims 8 or 9, wherein said electrode structural body comprises an electrode material layer and a collector, said electrode material layer comprising said fine powder, an electrically conductive auxiliary, and a binder, wherein said electrode material layer contains said electrically conductive auxiliary (C) in an amount in a range of 10 wt. %,≦[C]≦60 wt. %.

17. The electrode structural body according to claim 16, wherein the amount of said electrically conductive auxiliary (C) contained in said electrode material layer is in a range of 20 wt. %≦[C]≦50 wt %.

18. The electrode structural body according to claim 16, wherein the amount of said fine powder (A) contained in said electrode material layer is in a range of 30 wt. %≦[A]≦80 wt. %.

19. The electrode structural body according to claim 16, wherein said electrically conductive auxiliary comprises a graphite.

20. A rechargeable lithium battery in which oxidation-reduction reaction of lithium is used, comprising at least an anode, a cathode, and an electrolyte, characterized in that said anode comprises an electrode structural body defined in claims 8 or 9.

21. The rechargeable lithium battery according to claim 20, wherein said electrolyte comprises an electrolyte solution added with a compound selected from the group consisting of metal halides and amines.

22. The rechargeable lithium battery according to claim 20, wherein said fine powder has an average particle size (R) in a range of 0.1 µm≦R<0.5 µm.

23. The rechargeable lithium battery according to claim 20, wherein said fine powder is an amorphous phase-bearing fine powder.

24. The rechargeable lithium battery according to claim 20, wherein said fine powder has an oxidation preventive surface coat film which covers the surface of said fine powder.

25. The rechargeable lithium battery according to claim 24, wherein said oxidation preventive surface coat film comprises an oxide film.

26. The rechargeable lithium battery according to claim 24, wherein said oxidation preventive surface coat film comprises a polymer film.

27. The rechargeable lithium battery according to claim 26, wherein said fine powder is an amorphous phase-bearing fine powder.

28. The rechargeable lithium battery according to claim 24, wherein said fine powder whose surface is covered by said oxidation preventive surface coat film contains oxygen element (O) in an amount in a range of 0.5 wt. %≦[O]≦5 wt. %.

29. The rechargeable lithium battery according to claim 20, wherein said electrode structural body comprises an electrode material layer and a collector, said electrode material layer comprising said fine powder, an electrically conductive auxiliary, and a binder, wherein said electrode material layer contains said electrically conductive auxiliary (C) in an amount in a range of 10 wt. %≦[C]≦60 wt. %.

30. The rechargeable lithium battery according to claim 29, wherein the amount of said electrically conductive auxiliary (C) contained in said electrode material layer is in a range of 20 wt. %≦[C]≦50 wt. %.

31. The rechargeable lithium battery according to claim 29, wherein the amount of said fine powder (A) contained in said electrode material layer is in a range of 30 wt. %≦[A]≦80 wt. %.

32. The rechargeable lithium battery according to claim 29, wherein said electrically conductive auxiliary comprises a graphite.

33. An electrode structural body for a rechargeable lithium battery, characterized in that said electrode structural body has a fine powder of a silicon-based material whose principal component is silicon element, wherein said silicon-based material is a silicon alloy containing Si in an amount in a range of from 50 to 90 wt. %, Sn in an amount in a range of from 9 to 49 wt. %, and a transition metal element in an amount in a range of from 1 to 15 wt. %, wherein said fine powder has an oxidation preventive surface coat film which covers the surface of said fine powder, and wherein said fine powder whose surface is covered by said oxidation preventive surface coat film contains oxygen element (O) in an amount in a range of 0.5 wt. %$\leq$[O]$\leq$5 wt. %.

* * * * *

UNITED STATES PATENT AND TRADEMARK OFFICE
CERTIFICATE OF CORRECTION

PATENT NO.       : 7,141,187 B2
APPLICATION NO.  : 10/300305
DATED            : November 28, 2006
INVENTOR(S)      : Takeshi Kosuzu et al.

It is certified that error appears in the above-identified patent and that said Letters Patent is hereby corrected as shown below:

COVER PAGE:
(56) References Cited, U.S. PATENT DOCUMENTS (page two)
"2002/0055041 A1 5/2002 Koybayashi et al. ....429/221" should read
-- 2002/0055041 A1 5/2002 Kobayashi et al. .... 429/221 --.

(57) ABSTRACT
Line 9, "comprising" should read -- comprises --.

COLUMN 1:
Line 30, "comprising" should read -- comprises --.

COLUMN 2:
Line 18, "internal-shorts" should read -- internal shorts --;
Line 21, "ing" should read -- es --; and
Line 37, "internal-" should read -- internal --.

COLUMN 4:
Lines 7 and 10, "an" should read -- a --; and
Line 39, "comprising" should read -- comprises --.

COLUMN 5:
Lines 31, 38 and 48, "cycle" should read -- cycles --.

COLUMN 6:
Line 9, "is" should be deleted;
Line 12, "to able" should read -- to be able --;
Line 42, "are" should be deleted and "disappeared." should read -- disappear. --; and
Line 56, "mount" should read -- amount --.

COLUMN 8:
Lines 5 and 19, "rage" should read -- range --;
Line 23, "ally" should read -- alloy --; and
Line 52, "to used" should read -- to be used --.

COLUMN 10:
Line 63, "comprising" should read -- comprises --.

COLUMN 13:
Line 36, "additive" should read -- additives --.

UNITED STATES PATENT AND TRADEMARK OFFICE
CERTIFICATE OF CORRECTION

PATENT NO. : 7,141,187 B2
APPLICATION NO. : 10/300305
DATED : November 28, 2006
INVENTOR(S) : Takeshi Kosuzu et al.

It is certified that error appears in the above-identified patent and that said Letters Patent is hereby corrected as shown below:

COLUMN 15:
Line 52, "obtained" should read -- obtain --; and
Line 55, "silicon powder" should read -- silicon powder, --.

COLUMN 16:
Line 59, "comprising" should read -- comprises --.

COLUMN 17:
Line 26, "comprising" should read -- comprises --.

COLUMN 19:
Line 17, "prolong" should read -- prolonged --; and
Line 35, "comprising" should read -- comprises --.

COLUMN 20:
Line 20, "insetion" should read -- insertion --;
Line 25, "CuK α-rays" should read -- CuKα-rays --; and
Line 58, "covered such" should read -- covered such that --.

COLUMN 21:
Line 33, "to cause" should read -- causes --; and
Line 52, "possible diminish" should read -- possible to diminish --.

COLUMN 25:
Line 27, "a expanded" should read -- an expanded --.

COLUMN 26:
Line 18, "occur" should read -- to occur --.

COLUMN 27:
Line 8, "fist" should read -- first --; and
Line 44, "not gas" should read -- no gas --; and "not generated" should read
-- generated --.

COLUMN 29:
Line 31, "a expanded" should read -- an expanded --;
Line 60, "sufoxide," should read -- sulfoxide, --; and
Line 62, "sulfuly" should read -- sulfuryl --.

UNITED STATES PATENT AND TRADEMARK OFFICE
CERTIFICATE OF CORRECTION

PATENT NO. : 7,141,187 B2
APPLICATION NO. : 10/300305
DATED : November 28, 2006
INVENTOR(S) : Takeshi Kosuzu et al.

It is certified that error appears in the above-identified patent and that said Letters Patent is hereby corrected as shown below:

COLUMN 31:
Line 67, "internal-shorts." should read -- internal shorts. --.

COLUMN 32:
Line 8 "memberane" should read -- -- membrane --.

COLUMN 33:
Line 42, "having" should read -- has --.

COLUMN 34:
Line 2, "functions" should read -- function --; and
Line 36, "obtain" should read -- obtained --.

COLUMN 35:
Lines 47 and 51, "lithium is" should read -- Lithium is --.

COLUMN 37:
Line 13, "in" (first occurrence) should be deleted;
Line 30, "efficient" should read -- efficiency --; and
Line 65, "which" should be deleted.

COLUMN 38:
Line 7, "efficient" should read -- efficiency --.

COLUMN 39:
Lines 64 and 66, "having" should read -- has --.

COLUMN 42:
Line 1, "an" should read -- a --;
Line 2, "tub" should read -- tab --; and
Line 15, "one" should read -- on one --.

COLUMN 43:
Line 7, "10 m$\mu$" should read -- 10 $\mu$m --;
Line 19, "sell," should read -- cell, --;
Line 63, "an" should read -- a --; and
Line 64, "tub" should read -- tab --.

UNITED STATES PATENT AND TRADEMARK OFFICE
CERTIFICATE OF CORRECTION

PATENT NO. : 7,141,187 B2
APPLICATION NO. : 10/300305
DATED : November 28, 2006
INVENTOR(S) : Takeshi Kosuzu et al.

It is certified that error appears in the above-identified patent and that said Letters Patent is hereby corrected as shown below:

COLUMN 44:
Line 11, "arranged on" should read -- arranged on one --; and
Line 64, "ally" should read -- alloy --.

COLUMN 45:
Line 9, "what described" should read -- what is described --;
Line 12, "invent" should read -- invention --;
Line 22, "only" should read -- not only --;
Line 26, "rage" should read -- range --; and
Line 42, "layer a" should read -- layer has a --.

COLUMN 47:
Line 9, "prevcntive" should read -- preventive --; and
Line 63, "10 wt. %, ≤[C]≤60 wt. %." should read -- 10 wt. % ≤[C]≤60 wt. %. --.

Signed and Sealed this

Nineteenth Day of June, 2007

JON W. DUDAS
*Director of the United States Patent and Trademark Office*